US008829728B2

(12) United States Patent
Yamamoto et al.

(10) Patent No.: US 8,829,728 B2
(45) Date of Patent: Sep. 9, 2014

(54) POWER GENERATING APPARATUS, POWER GENERATING SYSTEM, AND WIRELESS ELECTRIC POWER TRANSMISSION APPARATUS WITH IMPEDANCE MATCHING

(75) Inventors: Hiroshi Yamamoto, Osaka (JP); Hiroshi Kanno, Osaka (JP)

(73) Assignee: Panasonic Corporation, Osaka (JP)

( * ) Notice: Subject to any disclaimer, the term of this patent is extended or adjusted under 35 U.S.C. 154(b) by 721 days.

(21) Appl. No.: 13/098,526

(22) Filed: May 2, 2011

(65) Prior Publication Data
US 2011/0266882 A1 Nov. 3, 2011

Related U.S. Application Data

(60) Provisional application No. 61/330,426, filed on May 3, 2010.

(51) Int. Cl.
*H01F 27/42* (2006.01)
*H02J 17/00* (2006.01)
*H02J 7/02* (2006.01)

(52) U.S. Cl.
CPC . *H02J 17/00* (2013.01); *H02J 7/025* (2013.01)
USPC ........................................................ 307/104

(58) Field of Classification Search
None
See application file for complete search history.

(56) References Cited

U.S. PATENT DOCUMENTS

| | | | |
|---|---|---|---|
| 5,522,943 A * | 6/1996 | Spencer et al. | 136/245 |
| 6,075,330 A * | 6/2000 | Terk | 318/280 |
| 6,321,067 B1 | 11/2001 | Suga et al. | |
| 6,339,538 B1 * | 1/2002 | Handleman | 363/95 |
| 6,427,065 B1 | 7/2002 | Suga et al. | |
| 2007/0178857 A1 * | 8/2007 | Greene et al. | 455/127.1 |
| 2007/0236296 A1 * | 10/2007 | Lee et al. | 330/302 |

(Continued)

FOREIGN PATENT DOCUMENTS

| | | |
|---|---|---|
| JP | 2004-312994 A | 11/2004 |
| JP | 2006-136045 A | 5/2006 |

(Continued)

OTHER PUBLICATIONS

Co-pending related U.S. Appl. No. 12/853,351, filed Aug. 10, 2010; application provided.
International Search Report for corresponding International Application No. PCT/JP2011/002491 mailed Aug. 9, 2011.

*Primary Examiner* — Rexford Barnie
*Assistant Examiner* — David Shiao
(74) *Attorney, Agent, or Firm* — Renner, Otto, Boisselle & Sklar, LLP

(57) ABSTRACT

A power generator includes an impedance matching section for oscillating section that is arranged between the oscillating section and the power-transmitting antenna, and configured to match an input impedance of the power-transmitting antenna to an output impedance of the oscillating section, and a transmitting-end control section configured to match an input impedance of the oscillating section to an output impedance of the power generating section by changing the input impedance of the oscillating section in accordance with a variation in the output impedance of the power generating section, and configured to match an input impedance of the impedance matching section for oscillating section to the output impedance of the oscillating section by changing the input impedance of the impedance matching section for oscillating section in accordance with the variation in the output impedance of the power generating section.

34 Claims, 22 Drawing Sheets

(56) References Cited

U.S. PATENT DOCUMENTS

| | | | |
|---|---|---|---|
| 2008/0015070 A1 | 1/2008 | Miura | |
| 2008/0278264 A1 | 11/2008 | Karalis et al. | |
| 2009/0160258 A1* | 6/2009 | Allen et al. | 307/82 |
| 2009/0187367 A1* | 7/2009 | Kao et al. | 702/108 |
| 2009/0243397 A1* | 10/2009 | Cook et al. | 307/104 |
| 2010/0033156 A1* | 2/2010 | Abe et al. | 323/305 |
| 2010/0181837 A1* | 7/2010 | Seeker et al. | 307/72 |
| 2010/0207572 A1* | 8/2010 | Kirby et al. | 320/101 |
| 2012/0098350 A1* | 4/2012 | Campanella et al. | 307/104 |

FOREIGN PATENT DOCUMENTS

| | | |
|---|---|---|
| JP | 2006-320047 A | 11/2006 |
| JP | 2007-013022 A | 1/2007 |
| JP | 2008-263710 A | 10/2008 |
| JP | 2008-295297 A | 12/2008 |
| JP | 2010-063324 A | 3/2010 |
| NL | EP 0208984 A1 * | 1/1987 |

* cited by examiner

FIG.13
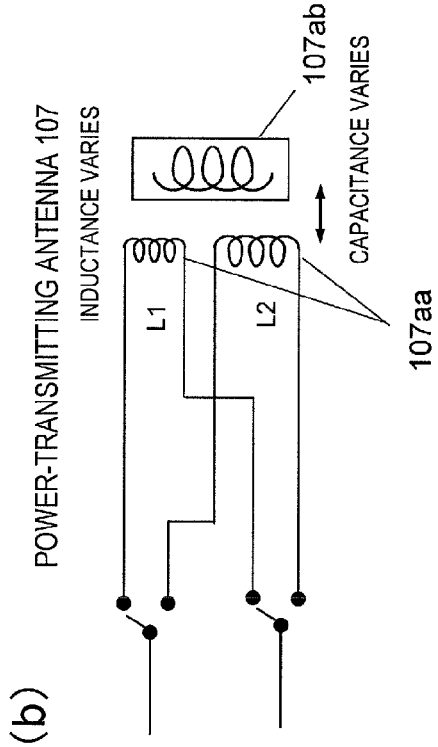
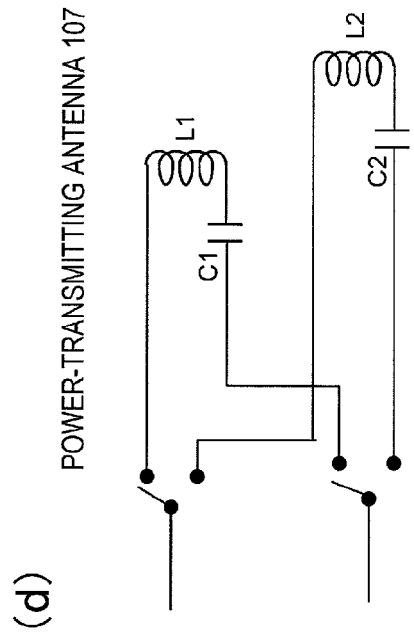
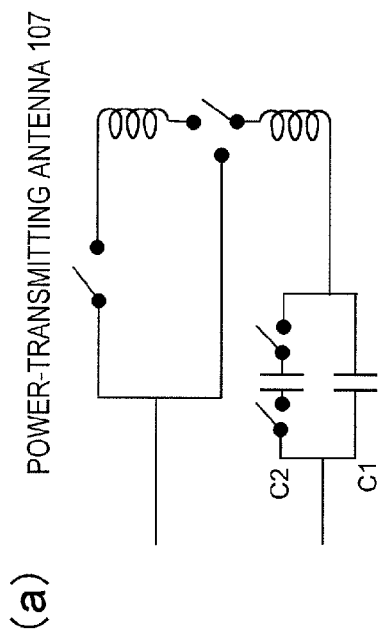
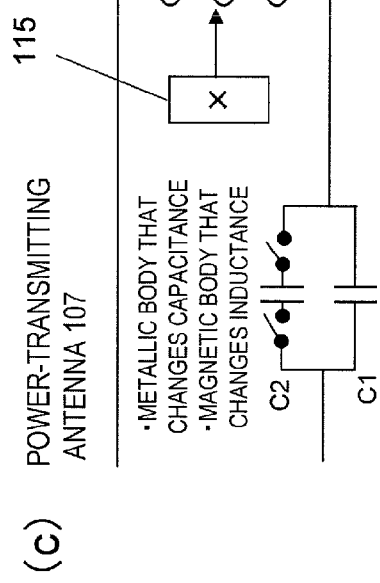

FIG.18
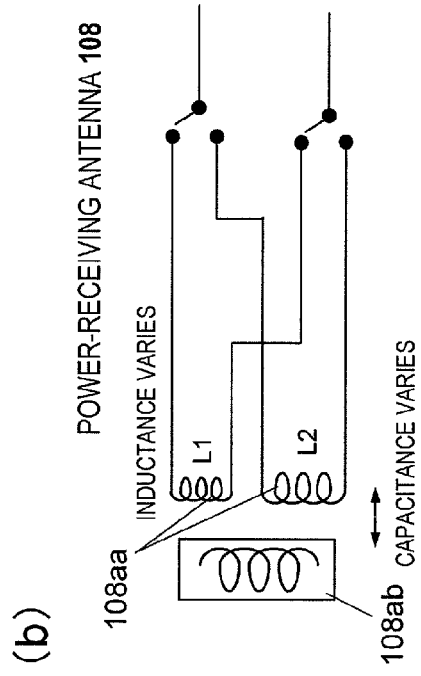
(b)
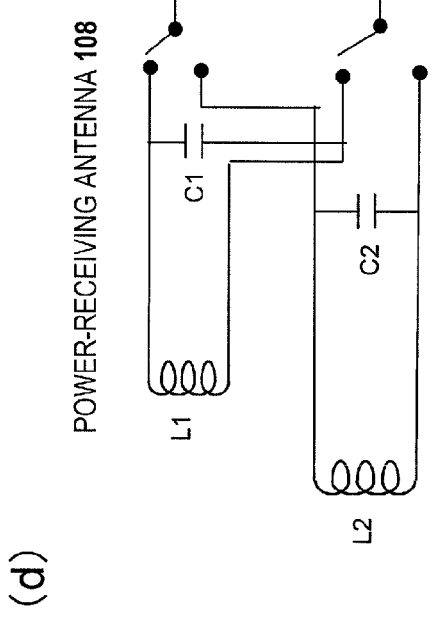
(d)
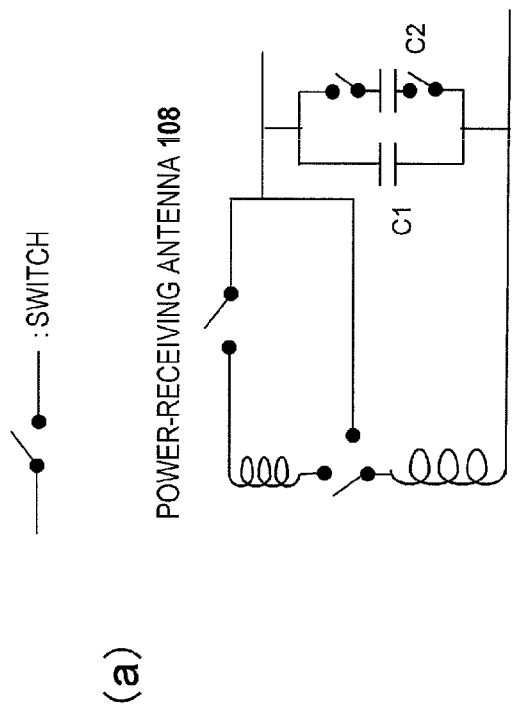
(a)
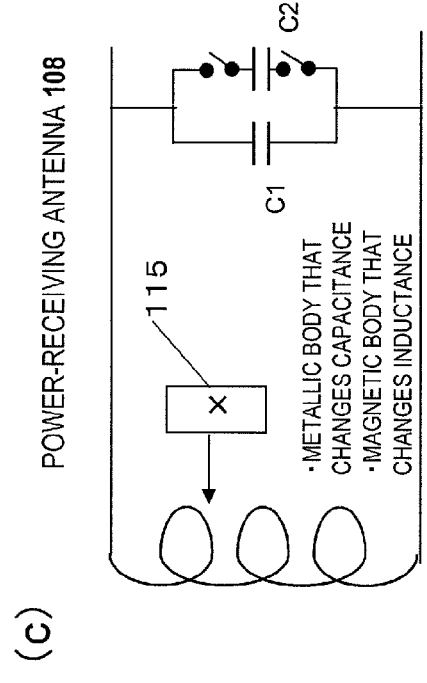
(c)

POWER GENERATING APPARATUS, POWER GENERATING SYSTEM, AND WIRELESS ELECTRIC POWER TRANSMISSION APPARATUS WITH IMPEDANCE MATCHING This application claims priority under 35 USC §119(e) to U.S. Provisional Application No. 61/330,426 filed on May 3, 2010, the entire contents of which are incorporated herein by reference.

BACKGROUND OF THE INVENTION

1. Field of the Invention

The present invention relates to a power generator, power generation system and wireless power transmission system for transferring energy through the air.

2. Description of the Related Art

To avoid exhausting valuable natural resources and to cope with the global warming effect that has been growing year by year, people have been paying more and more attention to solar power generation that never releases harmful carbon dioxide. In fact, a power plant for generating a lot of electric power by installing a huge number of solar power generators (i.e., so-called "solar cells", which will be sometimes simply referred to herein as "cells") in a wide area has become a reality. In most cases, solar power generators for general consumers have been installed on the roof of a house. Recently, however, some people have proposed putting those cells on the walls of a building, too.

A solar power generation system ordinarily uses a so-called "solar cell module" in which a huge number of cells are arranged inside a metallic frame and connected together. A glass plate is arranged in front of the solar cell module (which will be simply referred to herein as a "module") so that the respective cells operate without being exposed to the air. And by assembling a number of such solar cell modules together, a solar power generation system can be established.

Such a solar power generation system, however, has not been widespread yet because the cost of manufacturing those cells and modules is too high, which is one of the major obstacles to its introduction. On top of that, the cost of establishing such a system by installing those cells and modules is also too high to ignore. Among other things, the higher the altitude of the place of installation, the riskier and the more expensive the installation work will be, which is a serious problem to overcome in order to further popularize the solar power generation system. What is more, to introduce a solar power generation system into a non-new building, it is difficult to install to connect the solar power generating section outside of the building to electronic devices inside of the building, which is also one of the big problems with conventional solar power generation systems.

As will be described later, in a conventional solar power generation system, the output voltage of each of its cells is so low that a great many solar cells should be connected together to obtain a voltage that is high enough to operate an electronic device. And a decrease in reliability at such a huge number of connection points is a decisive factor in the decline of the long-term reliability of the overall system. In addition, if those modules and cables get deteriorated with a long-term use, their replacements should also be installed at such a height. Consequently, the cost of maintenance is non-negligible.

As a conventional solar power generator that would overcome such problems, a power supply system for supplying energy wirelessly from outside of a building and through the walls of the building has been proposed (see Japanese Patent Application Laid-Open Publication No. 2006-136045 (Embodiment 5 and FIG. 16), for example). Such a power supply system transmits RF (radio frequency) energy through the walls by electromagnetic induction.

Meanwhile, a power generation system that uses a fuel cell such as a polymer electrolyte fuel cell has also become more and more popular these days. In a power generation system of that type, the output voltage of each of its cells is also so low that a great many cells should be connected together to obtain a sufficiently high voltage. That is why as in the solar power generating device, a decrease in reliability at such a huge number of connection points is a decisive factor in the decline of the long-term reliability of the overall system.

On the other hand, United States Patent Application Publication No. 2008/0278264 (FIGS. 6 and 11) discloses a new type of wireless energy transfer system for transferring energy from one of two resonators to the other, and vice versa, through the air between them. That wireless energy transfer system couples those two resonators with each other via the evanescent tail of the oscillation energy of the resonant frequency that is produced in the space surrounding those two resonators, thereby transferring the oscillation energy wirelessly (i.e., by a non-contact method). Such an energy transfer method in which a magnetic field distribution is used by resonators will be referred to herein as "resonant magnetic coupling method".

According to United States Patent Application Publication No. 2008/0278264, the wireless power transmission by the resonant magnetic coupling method should increase the transmission distance significantly compared to the conventional electromagnetic induction method. That is to say, if the coupling coefficient k between the resonators is greater than the root of the product of the respective attenuation constants $\lceil 1$ and $\lceil 2$ of the two resonators, energy should be transferred as intended.

The power supply system disclosed in Japanese Patent Application Laid-Open Publication No. 2006-136045, however, cannot overcome the solar power generation device's own problem that the output voltage of each cell is low. In the field of solar power generation, a crystalline silicon based solar cell, which is currently used broadly due to its high energy conversion efficiency, has an output voltage Vc of just about 0.5 V. For example, if the DC output of a solar power generating section needs to be converted into AC power, the operation efficiency of a normal power conditioner is maximized in response to an input voltage of approximately 300 Vdc. That is why to get that conversion done with high efficiency, the output voltage of the solar power generating section should be increased to the vicinity of 300 V by connecting as many as several hundreds of cells together in series. On the other hand, if connected to a single-phase, three-wire grid (with a working voltage of 100 V or 200 V), which is a normal household wiring system, the solar power generating section may have its output voltage increased by a power conditioner as much as 200 fold or more. Considering the decrease in power efficiency to be caused by increasing the voltage that much, it is still preferred that a huge number of cells be connected together in series to increase the output voltage of the solar power generating section as much as possible.

It should be noted that even if the DC voltage is not converted into AC power within such a solar power generation system, a similar problem will also arise. For example, in a DC power supply system that has attracted a lot of attention these days, its working voltage will be either 48 Vdc or within the range of 300 to 400 Vdc. That is why even when solar energy needs to be supplied to a DC power supply system, several tens to several hundreds of solar cells also need to be connected together in series.

However, the greater the number of cells or modules to be connected together in series, the more easily the overall performance of the system will decline due to either so-called "partial shading" (i.e., some of the installation zone goes into the shade) or deterioration in the property of some of those cells or modules to be installed. To overcome such a problem, normally a countermeasure such as introduction of a bypass diode into each module is taken. Such a measure is not preferred because an excessive quantity of heat will be generated or the cost will rise significantly in that case. Meanwhile, even when the voltage needs to be increased using a normal DC/DC converter with a voltage boosting function, it is also difficult to achieve a voltage step-up ratio that is high enough to significantly reduce the number of cells to be connected together in series.

On the other hand, when wireless power transmission is carried out by the resonant magnetic coupling method, the output impedance Zoc of RF energy to be output from an oscillator is preferably substantially matched to the input impedance Zin of a power-transmitting antenna with the output terminal of a power-receiving antenna connected to a load. Also, the output impedance Zout of the power-receiving antenna is preferably substantially matched to the resistance value R of the load connected to the power-receiving antenna with the oscillator connected to the power-transmitting antenna. These conditions are preferably satisfied in order to minimize multiple reflection of RF energy between circuit blocks and to increase the overall power generation efficiency.

However, the output impedance of a solar cell may vary according to some environmental condition such as the intensity of the sunlight that irradiates the cell and the temperature of the cell itself. For that reason, if a fixed load is driven by a solar cell, mismatch may be caused between the output impedance of the cell and the impedance of the transmission line due to a variation in the intensity of the sunlight received or the temperature of the cell itself. As a result, the power transmission efficiency will decrease.

Likewise, the output impedance of a power generation system using a fuel cell also varies according to some environmental condition on its power generating section. Specifically, the output impedance of the power generating section may vary with the pressure of hydrogen gas injected or the temperature of the cell. In any case, it is difficult to maintain stabilized energy output under those environmental variations.

It is therefore an object of the present invention to provide a power generator and power generation system that can not only raise the ordinarily low output voltage of the power generating section significantly but also maintain stabilized energy output even under some environmental variations in the intensity of the sunlight received or its own temperature. Since the power can be transmitted wirelessly according to the present invention, the installation work and replacement of some cells or modules can get done much more easily.

The present invention is applicable to not just a solar power generation system but also a fuel cell power generator that uses a polymer electrolyte fuel cell, for example. According to the present invention, the ordinarily low output voltage of a power generating stack can be raised significantly on a cell-by-cell basis. Added to that, stabilized energy output can be maintained even if the pressure of hydrogen gas supplied or the environmental temperature varies. On top of that, even if any of those cells has gone out of order, such a defective cell can be replaced very easily according to the present invention.

SUMMARY OF THE INVENTION

A power generator according to the present invention includes: a power generating section that outputs DC energy; an oscillating section that converts the DC energy into RF energy with a frequency f0; a power-transmitting antenna that transmits the RF energy; a power-receiving antenna that receives at least a part of the RF energy that has been transmitted by the power-transmitting antenna; a rectifying section that converts the RF energy that has been received by the power-receiving antenna into DC energy; and a transmitting-end control section that matches the input impedance of the oscillating section to the output impedance of the power generating section by changing the input impedance of the oscillating section in accordance with a variation in the output impedance of the power generating section. The power-transmitting antenna is a series resonant circuit, and the power-receiving antenna is a parallel resonant circuit. And the resonant frequencies fT and fR of the power-transmitting and power-receiving antennas, respectively, are both set to be equal to the frequency f0 of the RF energy.

In one preferred embodiment, the power generator further includes a measuring section that measures the output current and output voltage of the power generating section. The output impedance value of the power generating section is detected based on the output current and output voltage that have been measured by the measuring section.

In another preferred embodiment, the power generator further includes an impedance matching section for oscillating section, which is arranged between the oscillating section and the power-transmitting antenna in order to match the input impedance of the power-transmitting antenna to the output impedance of the oscillating section. When the output impedance of the power generating section varies, the transmitting-end control section changes the input impedance of the impedance matching section for oscillating section accordingly, thereby matching the input impedance of the impedance matching section for oscillating section to the output impedance of the oscillating section.

In this particular preferred embodiment, if the output impedance of the power generating section varies, the transmitting-end control section changes the input impedance of the power-transmitting antenna accordingly, thereby matching the input impedance of the power-transmitting antenna to the output impedance of the impedance matching section for oscillating section.

In still another preferred embodiment, the oscillating section includes multiple oscillators having respective predefined input impedance ranges. The transmitting-end control section chooses one of the oscillators according to the output impedance value of the power generating section and makes current flow through the oscillator chosen, thereby changing the input impedance of the oscillating section.

In yet another preferred embodiment, the impedance matching section for oscillating section includes multiple matching circuits having respective predefined input impedance ranges. The transmitting-end control section chooses one of the matching circuits according to the output impedance value of the oscillating section and makes current flow through the matching circuit chosen, thereby changing the input impedance of the impedance matching section for oscillating section.

In yet another preferred embodiment, the impedance matching section for oscillating section includes multiple capacitors and multiple inductors. The transmitting-end control section chooses a combination including one of the capacitors and one of the inductors according to the output impedance value of the oscillating section, and makes current flow through the capacitor and the inductor that are included in the chosen combination, thereby changing the input impedance of the impedance matching section for oscillating section.

In yet another preferred embodiment, the power-transmitting antenna includes multiple inductors that are connected together in series and multiple capacitors that are connected in series to the inductors. The transmitting-end control section chooses at least one of the inductors and at least one of the capacitors according to the output impedance value of the power generating section, and makes current flow through the at least one inductor chosen and the at least one capacitor chosen, thereby changing the input impedance of the power-transmitting antenna.

In yet another preferred embodiment, the power-transmitting antenna includes: at least two inductors, which have mutually different inductances and which are arranged in parallel with each other; and another inductor, which is arranged in the vicinity of the at least two inductors. The transmitting-end control section chooses one of the at least two inductors according to the output impedance value of the power generating section, and makes current flow through the chosen inductor, thereby changing the input impedance of the power-transmitting antenna.

In yet another preferred embodiment, the power-transmitting antenna includes an inductor, multiple capacitors that are connected in series to the inductor, and a movable portion with a metallic or magnetic body. The transmitting-end control section changes the distance between the inductor and the movable portion, and chooses at least one of the capacitors, according to the output impedance value of the power generating section, and makes current flow through the at least one capacitor chosen, thereby changing the input impedance of the power-transmitting antenna.

In yet another preferred embodiment, the power-transmitting antenna includes multiple resonators, which have mutually different input impedances. The transmitting-end control section chooses one of the resonators according to the output impedance value of the power generating section, and makes current flow through the resonator chosen, thereby changing the input impedance of the power-transmitting antenna.

In yet another preferred embodiment, the power generator further includes: a impedance matching section for rectifying section, which is arranged between the power-receiving antenna and the rectifying section in order to match the input impedance of the rectifying section to the output impedance of the power-receiving antenna; and a receiving-end control section that matches the input impedance of the impedance matching section for rectifying section to the output impedance of the power-receiving antenna by changing the input impedance of the impedance matching section for rectifying section in accordance with a variation in the output impedance of the power generating section.

In this particular preferred embodiment, if the output impedance of the power generating section varies, the receiving-end control section changes the input impedance of the rectifying section accordingly, thereby matching the input impedance of the rectifying section to the output impedance of the impedance matching section for rectifying section.

In a specific preferred embodiment, if the output impedance of the power generating section varies, the receiving-end control section changes the output impedance of the power-receiving antenna accordingly, thereby matching the output impedance of the power-receiving antenna to the input impedance of the impedance matching section for rectifying section.

In still another preferred embodiment, the power generator further includes an environmental condition sensing section that measures an environmental parameter of the power generating section. When the environmental parameter that has been measured by the environmental condition sensing section varies, the receiving-end control section changes the input impedance of the impedance matching section for rectifying section accordingly, thereby matching the input impedance of the impedance matching section for rectifying section to the output impedance of the power-receiving antenna.

In this particular preferred embodiment, if the environmental parameter that has been measured by the environmental condition sensing section varies, the receiving-end control section changes the input impedance of the rectifying section accordingly, thereby matching the input impedance of the rectifying section to the output impedance of the impedance matching section for rectifying section.

In a specific preferred embodiment, if the environmental parameter that has been measured by the environmental condition sensing section varies, the receiving-end control section changes the output impedance of the power-receiving antenna accordingly, thereby matching the output impedance of the power-receiving antenna to the input impedance of the impedance matching section for rectifying section.

In yet another preferred embodiment, the impedance matching section for rectifying section includes multiple matching circuits, which have had their input impedance ranges defined in advance. The receiving-end control section chooses one of those matching circuits and makes current flow through the matching circuit chosen, thereby changing the input impedance of the impedance matching section for rectifying section.

In yet another preferred embodiment, the impedance matching section for rectifying section includes multiple capacitors and multiple inductors. The receiving-end control section chooses a combination including one of the capacitors and one of the inductors and makes current flow through the capacitor and the inductor that are included in the chosen combination, thereby changing the input impedance of the impedance matching section for rectifying section.

In yet another preferred embodiment, the rectifying section includes multiple rectifiers, which have had their input impedance ranges defined in advance, and the receiving-end control section chooses one of those rectifiers and makes current flow through the rectifier chosen, thereby changing the input impedance of the rectifying section.

In yet another preferred embodiment, the power-receiving antenna includes multiple inductors that are connected together in series and multiple capacitors that are arranged in parallel with the inductors. The receiving-end control section chooses at least one of the inductors and at least one of the capacitors and makes current flow through the at least one inductor chosen and the at least one capacitor chosen, thereby changing the output impedance of the power-receiving antenna.

In yet another preferred embodiment, the power-receiving antenna includes: at least two inductors, which have mutually different inductances and which are arranged in parallel with each other; and another inductor, which is arranged in the vicinity of the at least two inductors. The receiving-end control section chooses one of the at least two inductors and makes current flow through the chosen inductor, thereby changing the output impedance of the power-receiving antenna.

In yet another preferred embodiment, the power-receiving antenna includes an inductor, multiple capacitors that are arranged in parallel with the inductor, and a movable portion with a metallic or magnetic body. The receiving-end control section changes the distance between the inductor and the movable portion, chooses at least one of the capacitors and makes current flow through the at least one capacitor chosen, thereby changing the output impedance of the power-receiving antenna.

In yet another preferred embodiment, the power-receiving antenna includes multiple resonators, which have mutually different input impedances. The receiving-end control section chooses one of the resonators and makes current flow through the resonator chosen, thereby changing the output impedance of the power-receiving antenna.

In yet another preferred embodiment, the environmental parameter includes a parameter representing the irradiance of the sunlight received at the power generating section.

In an alternative preferred embodiment, the environmental parameter includes a parameter representing the temperature of the power generating section.

In a specific preferred embodiment, the environmental parameter measured by the environmental condition sensing section is transmitted wirelessly to the receiving-end control section.

In a specific preferred embodiment, the power generating section is a solar power generating section.

In a more specific preferred embodiment, the solar power generating section generates electric power by using crystalline silicon.

In one specific preferred embodiment, the solar power generating section and the power-transmitting antenna are arranged outside of a building and the power-receiving antenna is arranged inside of the building.

Alternatively, the solar power generating section, the power-transmitting antenna, and the power-receiving antenna may be arranged outside of a building, and the power-transmitting and power-receiving antennas may be arranged so as to face each other at least partially.

In yet another preferred embodiment, if the voltage step up ratio of the oscillating section is Voc, the inductance of the power-transmitting antenna is L1, the inductance of the power-receiving antenna is L2, and a coupling coefficient between the power-transmitting and power-receiving antennas is k, $(L2/L1) \geq 4 (k/Voc)^2$ is satisfied.

In this particular preferred embodiment, the rectifying section has an output voltage of 200 V to 300 V.

A power generation system according to the present invention includes a number of power generators. At least two of the power generators have their output terminals arranged in parallel with each other. And the at least two power generators are any of the preferred embodiments of the present invention described above.

A wireless power transmission system according to the present invention includes: an oscillating section that converts DC energy into RF energy with a frequency f0; a power-transmitting antenna that transmits the RF energy; a power-receiving antenna for receiving at least a part of the RF energy that has been transmitted by the power-transmitting antenna; a rectifying section that converts the RF energy that has been received by the power-receiving antenna into DC energy; and a transmitting-end control section that matches the input impedance of the oscillating section to the output impedance of a power generating section by changing the input impedance of the oscillating section in accordance with a variation in the output impedance of the power generating section. The power-transmitting antenna is a series resonant circuit, and the power-receiving antenna is a parallel resonant circuit. And the resonant frequencies fT and fR of the power-transmitting and power-receiving antennas are both set to be equal to the frequency f0 of the RF energy.

A power generator according to the present invention can transmit energy wirelessly through the air by a non-contact method. Thus, according to the present invention, the energy generated by a power generating section that is arranged outside of a building can be transmitted to an electronic device inside of that building. Thus, the cost of installing the power generator can be reduced and the job of replacing a deteriorated part of the power generating section can get done more easily.

In addition, according to the present invention, the output impedance of the power generator can be matched to the impedance of the transmission line according to the operating environment of the power generator. For that reason, the performance of the power generator hardly deteriorates even when the characteristics of respective elements of the power generator vary according to the irradiance of the sunlight received or the temperature. As a result, the power generator of the present invention can operate with high efficiency and good stability. Also, by arranging a number of power generators of the present invention in parallel with each other, a high efficiency and stabilized power generation system can be established. On top of that, the wireless power transmission system of the present invention can transmit the supplied DC energy with high efficiency and good stability, too.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 13(a) through 13(d) illustrate four different configurations for the power-transmitting antenna of the power generator according to the first preferred embodiment of the present invention.

FIGS. 18(a) through 18(d) illustrate four different configurations for the power-receiving antenna of the power generator according to the first preferred embodiment of the present invention.

DETAILED DESCRIPTION OF PREFERRED EMBODIMENTS

Before preferred embodiments of a power generator, a power generation system and a wireless power transmission system according to the present invention are described, the fundamental arrangement of the present invention will be described with reference to FIGS. 1 through 4.

Figure 1:
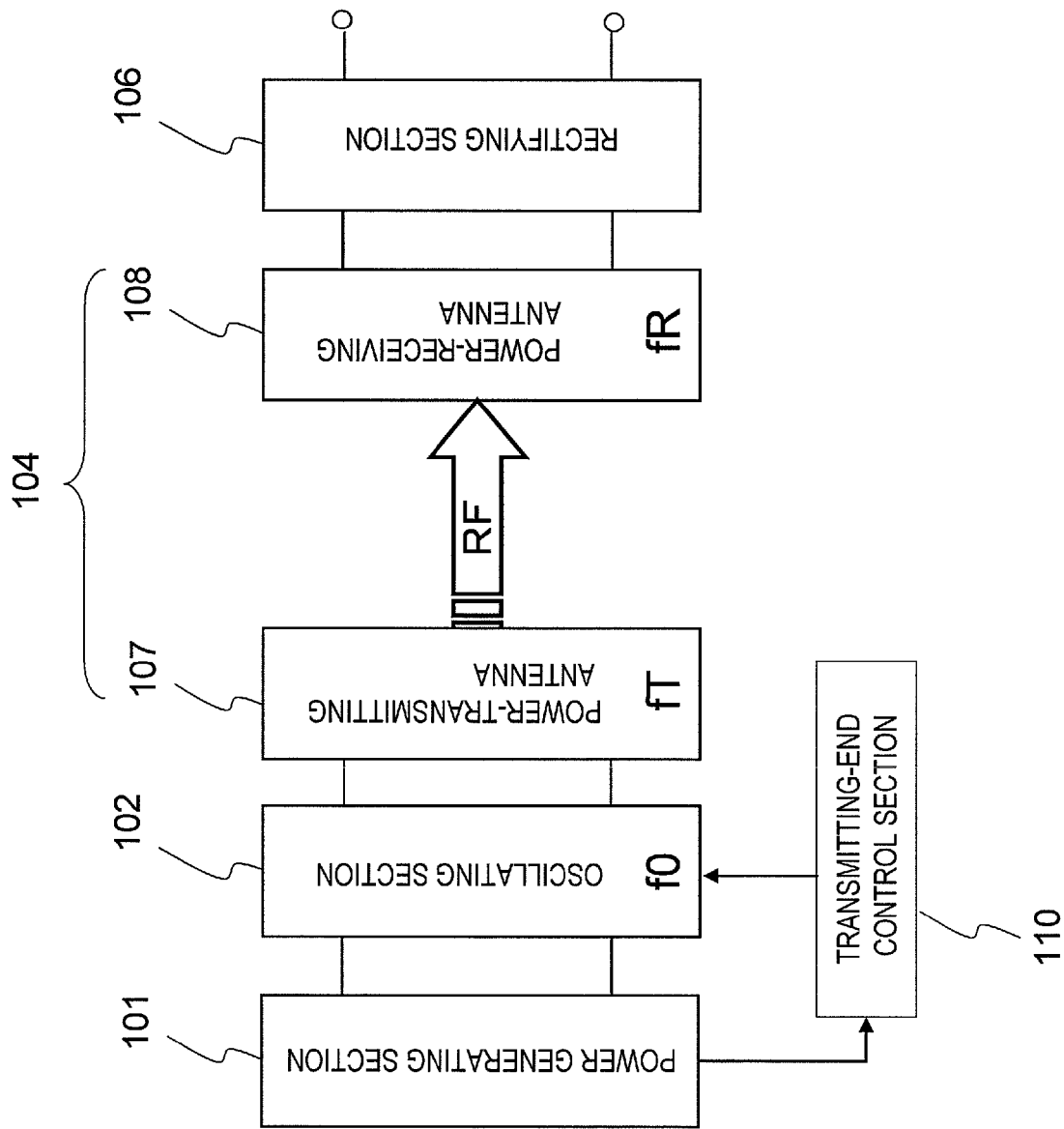
FIG. 1 illustrates a fundamental arrangement for a power generator according to the present invention.

FIG. 1 illustrates a fundamental arrangement for a power generator according to the present invention. In this example, the power generator includes a power generating section 101 that outputs DC energy, an oscillating section 102 that outputs radio frequency (RF) energy with an oscillation frequency f0, a power-transmitting antenna 107 with a resonant frequency fT, a power-receiving antenna 108 with a resonant frequency fR and a rectifying section 106 that converts the RF energy into DC energy. The power generator further includes a transmitting-end control section 110 for matching the input impedance of the oscillating section 102 to the output impedance of the power generating section 101. Both of the resonant frequencies fT and fR are set to be equal to the frequency f0, which may fall within the range of 50 Hz to 300 GHz and preferably falls within the range of 100 kHz to 10 GHz, more preferably within the range of 500 kHz to 20 MHz.

The oscillating section 102 receives the DC energy (electric power) from the power generating section 101 and converts that DC energy into RF energy with the frequency f0 (which will be referred to herein as a "DC-RF conversion"). Next, the RF energy is supplied from the oscillating section 102 to the power-transmitting antenna 107, which is connected to the oscillating section 102. The power-transmitting antenna 107 and power-receiving antenna 108, which are designed so as to have the same resonant frequency, are coupled together by the resonant magnetic field produced by their resonators. Thus, the power-receiving antenna 108 can receive efficiently at least a part of the RF energy that has been transmitted by the power-transmitting antenna 107. The power-receiving antenna 108 is not in contact with the power-transmitting antenna 107 but is located at a distance of several centimeters to several meters from the power-transmitting antenna 107. The RF energy that has been received by the power-receiving antenna 108 is then supplied to the rectifying section 106 and converted into DC energy there.

The transmitting-end control section 110 of the present invention changes the input impedance of the oscillating section 102 dynamically according to the output impedance of the power generating section 101. As a result, the input impedance of the power generating section 102 and the output impedance of the power generating section 101 can be kept matched to each other. Consequently, even if the output current or voltage characteristic of the power generating section 101 varies according to its environmental condition, the power generator of the present invention can still improve the overall power generation efficiency compared to conventional power generators.

In the power generator of the present invention, the "antenna" is not an ordinary antenna for transmitting or receiving a radio wave but an element for transferring energy from one of two objects to the other, and vice versa, by using a coupling phenomenon that has been produced by the evanescent tail of the electromagnetic field of the resonator. According to such a wireless power transmission technique that uses the resonant electromagnetic field, energy loss, which would otherwise be caused when an electromagnetic wave is transferred to a distant location, will not be caused, and therefore, the power can be transmitted with very high efficiency. Such an energy transmission technique that uses the coupling phenomenon of a resonant electromagnetic field (i.e., a near field) will cause much less loss than a known non-contact power transmission that uses the Faraday's law of electromagnetic induction. Rather, energy can be transmitted efficiently between two resonators (or antennas), which have an interval of as much as several meters between them.

To carry out a wireless power transmission based on such a principle, coupling by resonant magnetic coupling needs to be produced between two resonant antennas. As described above, according to the present invention, the resonant frequencies fT and fR are both set equal to the frequency f0 of the oscillating section 102. However, fT and fR do not have to be exactly equal to, but may be substantially equal to, f0. That is to say, neither fT nor fR needs to completely agree with f0. To transfer energy with high efficiency by taking advantage of the coupling phenomenon between the two resonators, ideally fT=fR should be satisfied. But actually there will be no problem as long as there is only a little difference between fT and fR. As used herein, if the frequency fT is equal to the frequency fR, then the following inequality (1) should be satisfied:

$$|fT-fR| \leq fT/QT + fR/QR \quad (1)$$

where QT is the Q factor of the power-transmitting antenna 107 as a resonator and QR is the Q factor of the power-receiving antenna 108 as a resonator. In general, if the resonant frequency is identified by X and the Q factor of a resonator is identified by Qx, a frequency range in which that resonator produces resonance is obtained by X/Qx. If this inequality |fT−fR|≤fT/QT+fR/QR is satisfied, energy can be transferred between the two resonators by resonant magnetic coupling.

Figure 2:
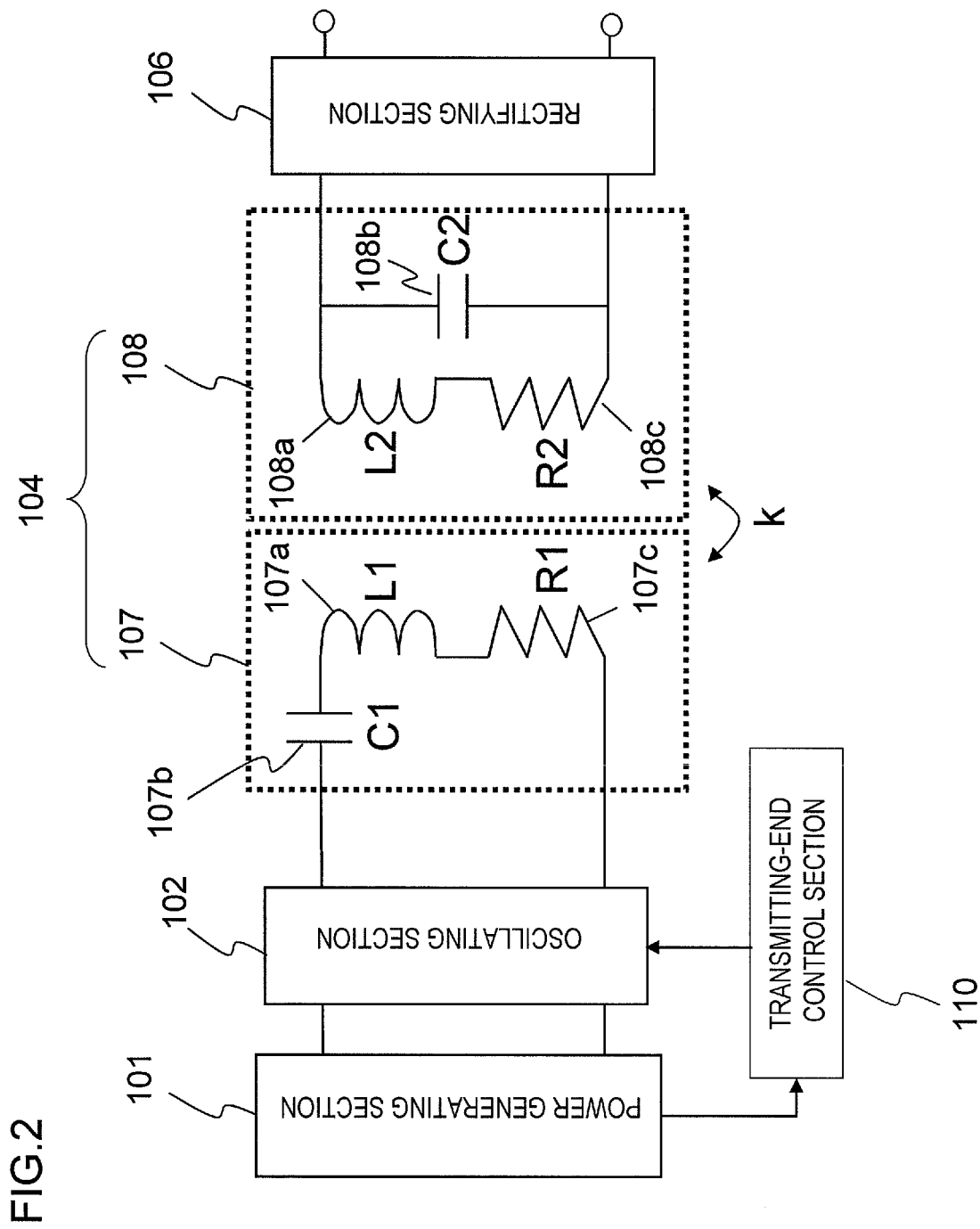
FIG. 2 illustrates an equivalent circuit of a wireless transmission section for the power generator of the present invention.

Next, reference is made to FIG. 2 which illustrates an equivalent circuit for the power-transmitting antenna 107 and the power-receiving antenna 108. In the example illustrated in FIG. 2, the power-transmitting antenna 107 is a series resonant circuit in which a first inductor 107a and a first capacitor 107b are connected together in series, while the power-receiving antenna 108 is a parallel resonant circuit in which a second inductor 108a and a second capacitor 108b are arranged in parallel with each other. The series resonant circuit of the power-transmitting antenna 107 has a parasitic resistance component R1 and the parallel resonant circuit of the power-receiving antenna 108 has a parasitic resistance component R2. It should be noted that the power-transmitting antenna 107 and the power-receiving antenna 108 do not always have the circuit configuration shown in FIG. 2 but may have any other configuration as long as these antennas 107 and 108 are implemented as a series resonant circuit and a parallel resonant circuit, respectively.

In a preferred embodiment of the present invention, if Voc represents the voltage step-up ratio of the oscillating section 102, L1 and L2 represent the inductances of the first and second inductors 107a and 108a, respectively, and k represents the coupling coefficient of the power-transmitting and power-receiving antennas 107 and 108, these L1, L2, k and Voc values are determined so as to satisfy the following inequality:

$$(L2/L1) \geq 4(k/Voc)^2$$

If this relation is satisfied, the voltage of the RF energy output by wireless power transmission can be at least twice as high as that of the DC energy input. That is to say, a voltage step-up ratio of at least two can be achieved. It will be described in detail later exactly why the voltage can be increased that much. Thus, by setting these parameters L1, L2, k and Voc appropriately, the power generator of the present invention can increase the voltage of low-voltage energy (electric power) during its transmission.

Even if the output voltage of the power generating section 101 is low, the power generator of the present invention can still output power with a high voltage thanks to the effect of the voltage increase. Consequently, the power generator of the present invention can efficiently increase, during the transmission, the voltage of low-voltage energy (electric power) that has been generated by a power generating section consisting of solar cells (i.e., a solar power generating section), for example. That is why the number of cells to be connected together in series can be reduced significantly. As a result, a new type of solar power generation system, which can be installed and maintained at lower cost and which will likely be quickly widespread in the near future, is provided.

Figure 3:
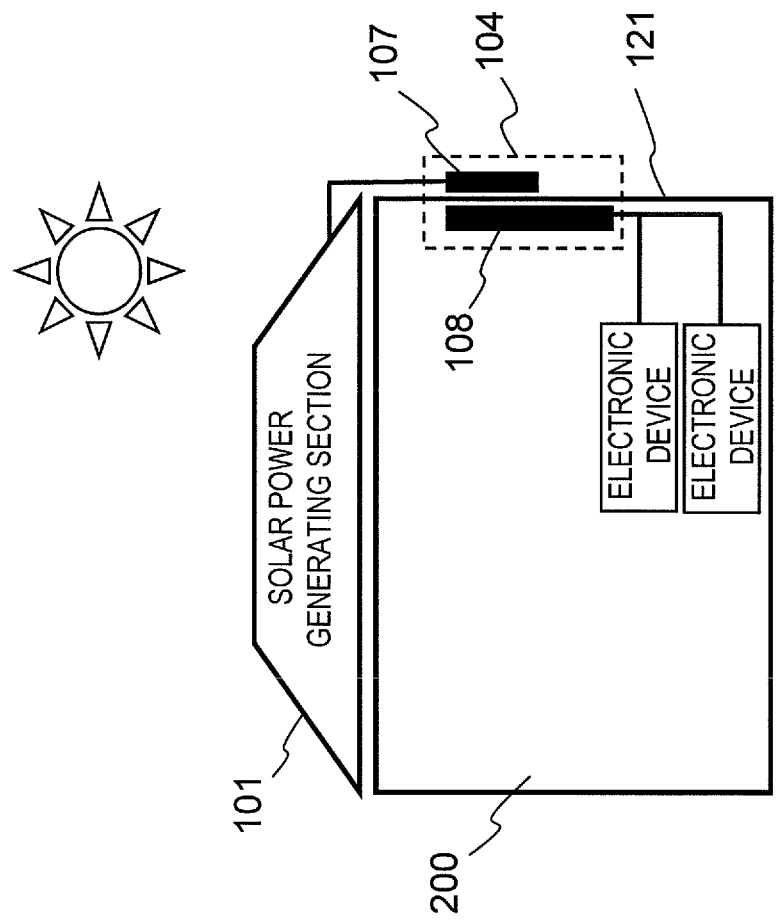
FIG. 3 is a schematic representation illustrating a typical application of the power generator of the present invention.

FIG. 3 is a schematic representation illustrating a typical application of the power generator of the present invention. As shown in FIG. 3, the power generator includes a solar power generating section 101, which is arranged outside of a building 200 (i.e., outdoors), and a wireless transmission section 104 for transmitting power to electronic devices, which are installed inside of the building 200. The wireless transmission section 104 includes power-transmitting and power-receiving antennas 107 and 108, which face each other with the wall 121 of the building 200 interposed between them. The power-transmitting antenna 107 is connected to the outdoor solar power generating section 101, while the power-receiving antenna 108 is connected to the indoor electronic devices. It should be noted that the solar power generating section 101 does not have to be put on the roof but could also be mounted on the wall 121 of this building 200 or installed on any other building as well. Optionally, both of the power-transmitting and power-receiving antennas 107 and 108 may be installed outdoors. Even so, these antennas 107 and 108 need be arranged so as to face each other at least partially.

The power generating devices that form the power generating section of the present invention do not have to be solar cells but may also be any other type of power generating devices as well. For example, the power generating section may include fuel cells. The voltage increase effect of the present invention will also be achieved significantly in fuel cells because a fuel cell outputs DC energy with a relatively low voltage and is used in conjunction with a high-voltage system.

Figure 4:
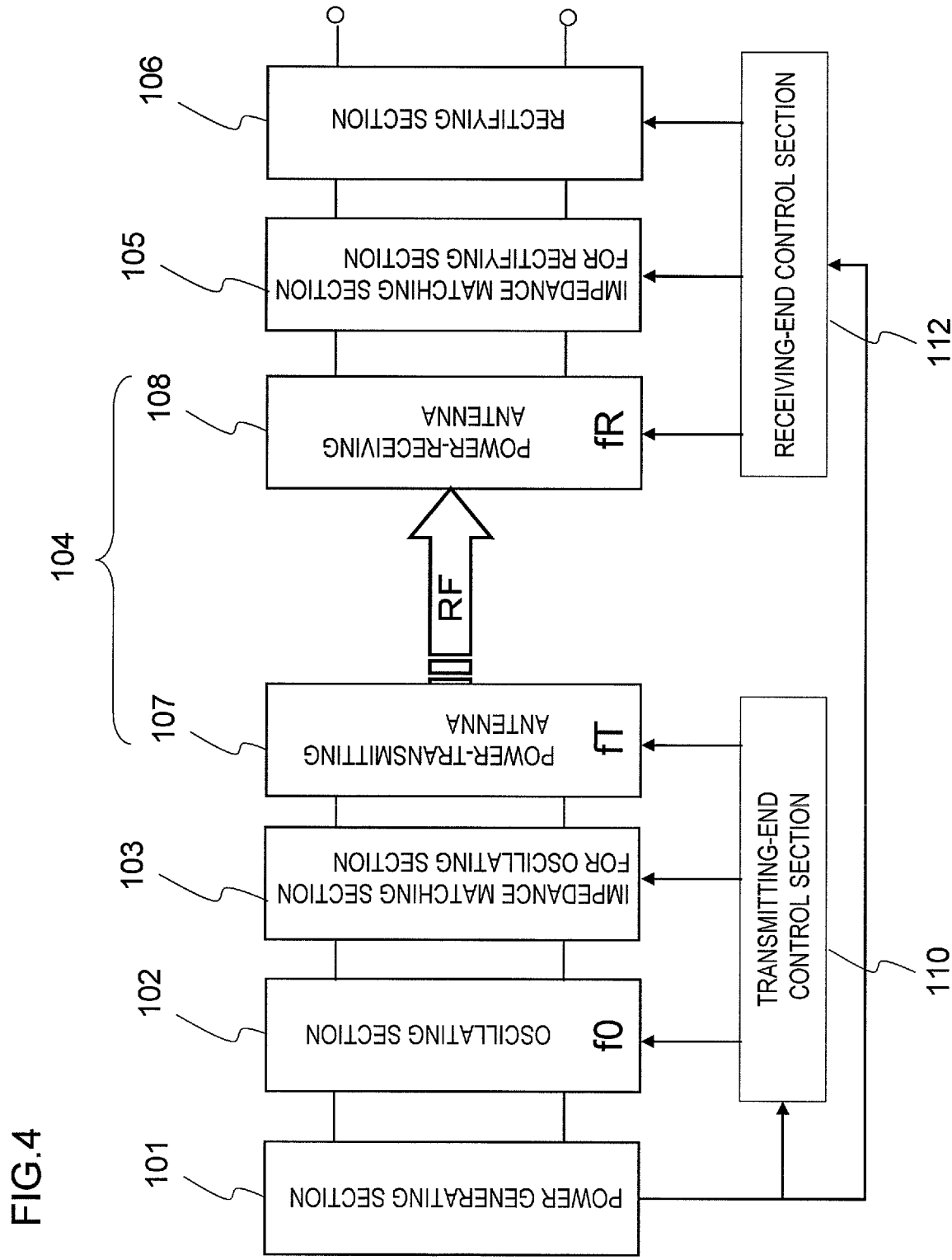
FIG. 4 illustrates the arrangement of another power generator according to the present invention.

FIG. 4 illustrates an exemplary configuration for a power generator that can further increase the impedance matching effect described above. This power generator includes not only every component of the power generator shown in FIG. 1 but also an impedance matching section for oscillating section 103, a impedance matching section for rectifying section 105 and a receiving-end control section 112 as well.

The impedance matching section for oscillating section 103 is arranged between the oscillating section 102 and the power-transmitting antenna 107 in order to match the output impedance of the oscillating section 102 to the input impedance of the power-transmitting antenna 107. The transmitting-end control section 110 controls the input and output impedances of not just the oscillating section 102 but also the impedance matching section for oscillating section 103 and the power-transmitting antenna 107 in accordance with a variation in the output impedance of the power generating section 101. As a result, the respective circuit blocks on the transmitting end can have their impedances matched to each other.

The impedance matching section for rectifying section 105 is arranged between the power-receiving antenna 108 and the rectifying section 106 in order to match the output impedance of the power-receiving antenna 108 to the input impedance of the rectifying section 106. The receiving-end control section 112 controls the input and output impedances of the power-receiving antenna 108, the impedance matching section for rectifying section 105 and the rectifying section 106 in accordance with a variation in the output impedance of the power generating section 101 or a variation in an environmental parameter of the power generating section 101. As a result, the respective circuit blocks on the receiving end can have their impedances matched to each other.

Thus, the power generator with the configuration shown in FIG. 4 can match the impedances of the respective circuit blocks to each other in accordance with either a variation in an environmental parameter of the power generating section 101 or a variation in the output impedance of the power generating section 101. As a result, multiple reflection between the circuit blocks can be minimized and the overall power generation efficiency of the power generator can be further increased.

If a number of power generators of the present invention are arranged in parallel with each other, a power generation system with further stabilized characteristics can be established. Also, a wireless power transmission system can be formed by all of the components of the power generator shown in FIG. 1 but the power generating section 101. That is to say, the wireless power transmission system of the present invention includes the oscillating section 102, the power-transmitting antenna 107, the power-receiving antenna 108, the rectifying section 106 and the transmitting-end control section 110. Such a wireless power transmission system can transmit externally supplied DC energy wirelessly to an external load with high efficiency based on the principle described above.

Hereinafter, preferred embodiments of the present invention will be described with reference to the accompanying drawings.

Embodiment 1

Hereinafter, a First Preferred Embodiment of a power generator according to the present invention will be described with reference to FIGS. 5 through 21, in which any component also shown in FIGS. 1 through 4 and having substantially the same function as its counterpart is identified by the same reference numeral.

Figure 5:
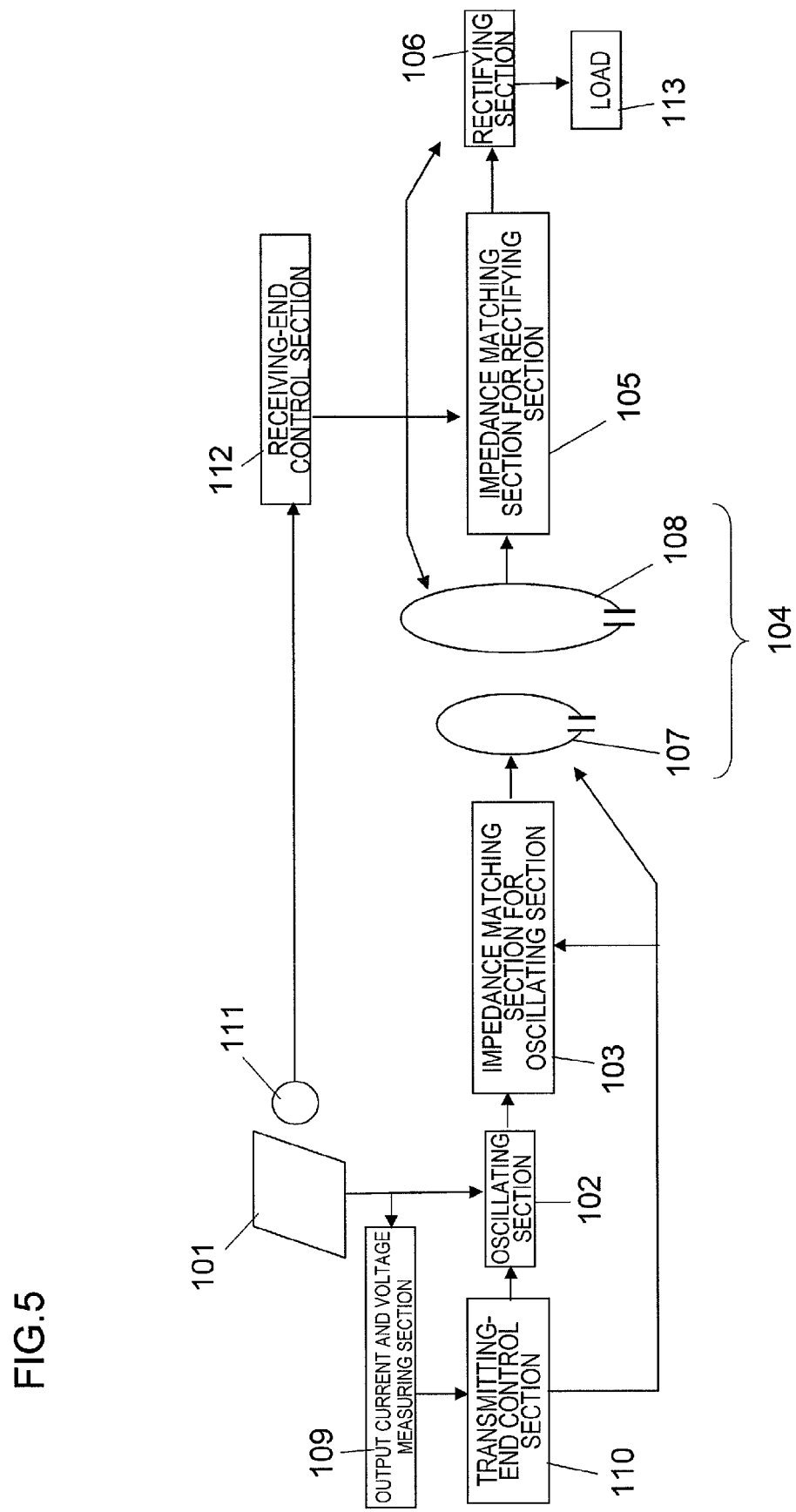
FIG. 5 illustrates a power generator as a first specific preferred embodiment of the present invention.

FIG. 5 is a schematic representation illustrating a configuration for a power generator as a first specific preferred embodiment of the present invention. As shown in FIG. 5, the power generator of this preferred embodiment includes a power generating section 101, an oscillating section 102, an impedance matching section for oscillating section 103, a wireless transmission section 104, a impedance matching section for rectifying section 105 and a rectifying section 106, which are connected together in series. The rectifying section 106 is connected to, and followed by, a load 113. The power generator further includes an output current and voltage measuring section 109 for measuring the output current and output voltage of the power generating section 101, a transmitting-end control section 110 for matching the impedances of the respective circuit blocks on the transmitting end, an environmental condition sensing section 111 for measuring an environmental parameter of the power generating section 101, and a receiving-end control section 112 for matching the impedances of the respective circuit blocks on the receiving end. In the power generator of this preferred embodiment, the transmitting-end control section 110 matches the impedances of the respective circuit blocks on the transmitting end to each other in accordance with the output of the output current and voltage measuring section 109. On the other hand, the receiving-end control section 112 matches the impedances of the respective circuit blocks on the receiving end to each other in accordance with the output of the environmental condition sensing section 111. The transmitting-end control section 110 and the receiving-end control section 112 are, for example, consisting of a CPU.

In this preferred embodiment, the power generating section 101 includes a number of solar cells (which will be sometimes simply referred to herein as "cells") that are connected together in series. To increase the power generation efficiency as much as possible, the solar cells are preferably crystalline silicon solar power generators. But the solar cells for use in the present invention may also be any of various other types of solar power generators that use a compound semiconductor material such as gallium arsenide or a CIS based material. Or the solar cells may even be any of numerous kinds of solar power generators that use an organic material. If a semiconductor material is used, the crystal structure of the semiconductor may be a single crystalline, polycrystalline or amorphous one. Optionally, a tandem type solar power generator, in which several types of semiconductor materials are stacked one upon the other, may also be used.

As the oscillating section 102, a class D, E or F amplifier that would realize high efficiency and low distortion may be used. Or a Doherty amplifier could also be used. Optionally, a sinusoidal wave may be produced with high efficiency by arranging either a low-pass filter or a band pass filter after a switching element that generates an output signal with a distortion component.

The wireless transmission section 104 includes a power-transmitting antenna 107 and a power-receiving antenna 108. To achieve as high transmission efficiency as possible, the power-transmitting antenna 107 and power-receiving antenna 108 are preferably arranged so as to face each other. Nevertheless, the power-transmitting and power-receiving antennas 107 and 108 do not always have to face each other but could be arranged in any other way unless they cross each other at right angles.

As the rectifying section 106, various types of rectifiers, including full-wave rectifiers and bridge rectifiers, are available. Also, if a voltage doubler rectifier is used, a DC voltage, which is twice as high as the RF voltage supplied to the rectifying section 106, can be output. There are other types of high voltage step-up ratio rectifiers that can achieve a voltage step-up ratio of three or more and any of those various rectifiers may also be used in the present invention. By using such a rectifier as the rectifying section 106, the voltage that has already been increased by the wireless transmission section 104 can be further raised.

The DC energy that has been generated by the power generating section 101 is converted by the oscillating section 102 into RF energy with high efficiency. Then, the RF energy is transmitted wirelessly through the air (and the wall) by the wireless transmission section 104, converted into DC energy by the rectifying section 106, and then supplied to the load 113.

The load 133 may be a normal electronic device or a storage battery. Also, the load 133 may be an inverter function circuit for converting direct current into alternating current, a voltage step-up/down function circuit, or a power conditioner that has both of the inverter function and the voltage step-up/down function in combination.

The output current and voltage measuring section 109 includes a meter for measuring the output current and output voltage of the power generating section 101 and sends a result of measurement to the transmitting-end control section 110. Based on the result of measurement received from the output current and voltage measuring section 101, the transmitting-end control section 110 calculates the output impedance of the power generating section 101. And when the calculated output impedance of the power generating section 101 varies, the transmitting-end control section 110 changes the input impedances of the oscillating section 102, the impedance matching section for oscillating section 103 and the power-transmitting antenna 107 accordingly. In this manner, the impedances of the respective components on the transmitting end can be matched to each other.

The (power generation) environmental condition sensing section 111 is a sensor that is arranged near the power generating section 101 to monitor the power generation environmental condition (which will be referred to herein as "environmental parameters") of the power generating section 101. In this preferred embodiment, examples of those environmental parameters include the irradiance of the sunlight received at the surface of the power generating section 101 and the temperature of the power generating section 101. The environmental condition sensing section 111 transmits the environmental parameters measured to the receiving-end control section 112 either wirelessly or through a cable. And if any of the environmental parameters that have been transmitted from the environmental condition sensing section 111 has varied, the receiving-end control section 112 changes the respective input impedances of the power-receiving antenna 108, the impedance matching section for rectifying section 105 and the rectifying section 106 accordingly. As a result, the respective circuit blocks on the receiving end can have their impedances matched to each other.

Hereinafter, the configuration and operation of the wireless transmission section 104 will be described with reference to FIG. 6.

The power-transmitting antenna 107 of this preferred embodiment is a series resonant circuit including a first inductor 107a and a first capacitor 107b, while power-receiving antenna 108 is a parallel resonant circuit including a second inductor 108a and a second capacitor 108b. The respective resonant frequencies fT and fR of the power-transmitting antenna 107 and power-receiving antenna 108 are set to be approximately equal to the frequency f0 of the RF energy generated by the oscillating section 102. Also, in this preferred embodiment, the output impedance Zout of the power-receiving antenna 108 is defined to be higher than the input DC impedance Zdc of the oscillating section 102.

Based on this principle, according to this preferred embodiment, the distance between the power-transmitting and power-receiving antennas 107 and 108 may be set within the range of several centimeters to several meters, and the energy can still be transferred highly efficiently even if there is the wall 121 between them. In addition, according to this preferred embodiment, not just can such a non-contact connection be done wirelessly but also the output voltage of the RF energy provided by the power-receiving antenna 108 has been increased sufficiently compared to the input voltage of the incoming RF energy that has reached the power-transmitting antenna 107.

According to this preferred embodiment, there may be a wall 121 (FIG. 3) between the power-transmitting and power-receiving antennas 107 and 108. Or the power-transmitting and power-receiving antennas 107 and 108 may face each other with no obstacle put between them. Or even the roof may be interposed between the power-transmitting and power-receiving antennas 107 and 108.

It should be noted that the power-transmitting and power-receiving antennas 107 and 108 could be both installed indoors or both arranged outdoors. In either case, the voltage can also be increased while power is being transmitted wirelessly between the two antennas. If both of the power-transmitting and power-receiving antennas 107 and 108 are installed indoors, then the outdoor solar power generating section 101 may be connected to the power-transmitting antenna 107 by way of a cable to be passed through a hole that has been cut through the wall 121 of the building 200. On the other hand, if both of the power-transmitting and power-receiving antennas 107 and 108 are arranged outdoors, the indoor electronic devices may also be connected to the power-receiving antenna 108 by way of a cable to be passed through a hole that has been cut through the wall 121 of the building 200. To eliminate such cable connection between inside and outside of the building, it is preferred that the power-transmitting antenna 107 be arranged outdoors and the power-receiving antenna 108 be installed indoors as in the example illustrated in FIG. 3.

According to this preferred embodiment, the efficiency of the wireless power transmission depends on the gap between the power-transmitting and power-receiving antennas 107 and 108 (which will be referred to herein as an "antenna-to-antenna gap") and on the magnitude of loss caused by circuit components that form the power-transmitting and power-receiving antennas 107 and 108. As used herein, the "antenna-to-antenna gap" substantially means the gap between the two inductors 107a and 108a. The antenna-to-antenna gap can be estimated based on the feature size of the areas occupied by those antennas.

In one preferred embodiment of the present invention, the first and second inductors 107a and 108a both have the same planar pattern and are arranged so as to face each other and be parallel to each other. As used herein, the "feature size" of an antenna's arrangement area refers to a relatively small dimension of the area in which that antenna is arranged. Specifically, if the inductor of an antenna has a circular planar pattern, then the feature size is defined to be the diameter of the inductor. On the other hand, if the inductor has a square planar pattern, the feature size is defined to be the length of each side thereof. And if the inductor has a rectangular planar pattern, the feature size is defined to be the length of its shorter sides. According to this preferred embodiment, even if the antenna-to-antenna gap is approximately 1.5 times as large as the feature size of the antenna's arrangement area, energy can also be transferred with a wireless transmission efficiency of 90% or more.

Next, the voltage increase effect produced by the power generator of the present invention will be described.

Suppose the power-transmitting antenna 107 at the transmitting end and the power-receiving antenna 108 at the receiving end are coupled with each other at a coupling coefficient k. By measuring the two resonant frequencies fL and fH to be separated when two resonators (i.e., the antennas 107 and 108) that produce resonance at the same frequency f0 are arranged close to each other, the coupling coefficient k can be derived by the following Equation (2):

$$k=(fH^2-fL^2)/(fH^2+fL^2) \tag{2}$$

The frequency f0 of the oscillating section 102 is preferably set to be close to the resonant frequencies fL and fH. More specifically, if the Q factors of the pair of coupled resonators at the resonant frequencies fL and fH are represented by QL and QH, respectively, f0 is preferably set so as to satisfy the following inequality (3):

$$fL-fL/QL \le f0 \le fH+fH/QH \tag{3}$$

Also, the mutual inductance M produced between the first inductor 107a with the inductance L1 and the second inductor 108a with the inductance L2 and the coupling coefficient k satisfy the following Equation (4):

$$M=k \times (L1 \times L2)^{0.5} \tag{4}$$

Figure 6:
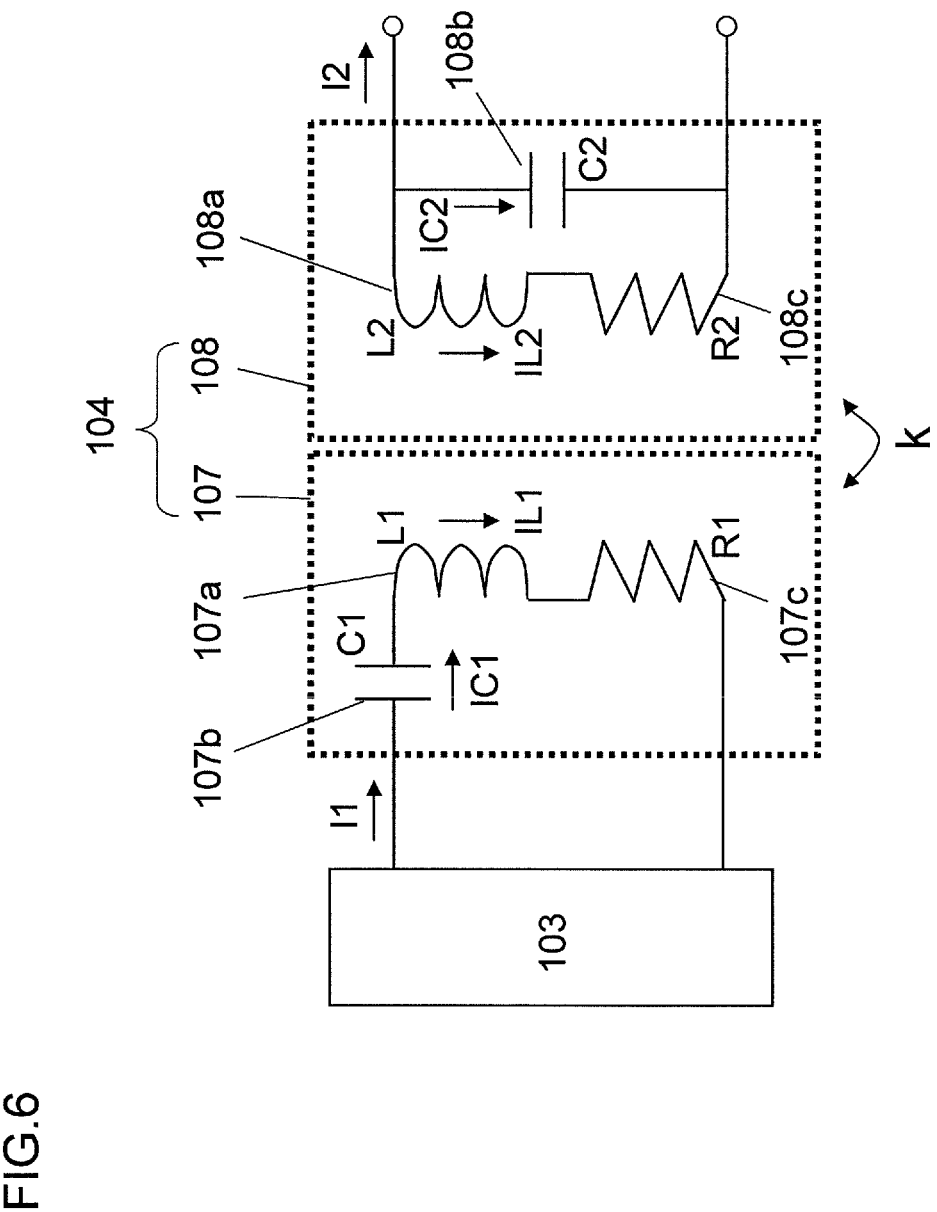
FIG. 6 illustrates a configuration for the power-transmitting and power-receiving antennas of a power generator according to the first preferred embodiment of the present invention.

Supposing in the parallel resonant circuit of the power-receiving antenna 108, the RF current flowing through the second inductor 108a is identified by IL2 and the RF current flowing through the second capacitor 108b is identified by IC2, the output RF current I2 flowing in the direction shown in FIG. 6 is represented by the following Equation (5):

$$I2=-IL2-IC2 \tag{5}$$

Also, supposing the RF current flowing through the first inductor 107a is identified by IL1, the following Equation (6) can be derived using the RF current IL2 flowing through the second inductor 108a, the RF current IC2 flowing through the second capacitor 108b, the inductance L2 of the second inductor 108a, the parasitic resistance R2 of the second inductor 108a, the inductance L1 of the first inductor 107a and the capacitance C2 of the second capacitor 108b:

$$(R2-j\omega L2) \times IL2 + j\omega M \times IL1 = IC2/(j\omega C2) \quad (6)$$

wherein, $\omega=2\pi f0$. Since the resonance condition is satisfied by the power-receiving antenna 108, the following Equation (7) is met:

$$\omega L2 = 1/(\omega C2) \quad (7)$$

The following Equation (8) can be derived from Equations (5), (6) and (7):

$$R2 \times IL2 + j\omega M \times IL1 = j\omega L2 \times I2 \quad (8)$$

By modifying this Equation (8), the following Equation (9) is obtained:

$$I2 = k \times (L1/L2)^{0.5} \times IL1 - j(R2/\omega L2) \times IL2 \quad (9)$$

On the other hand, an index Q factor for evaluating the degree of low loss of the resonator of the power-transmitting antenna 107 is given by the following Equation (10):

$$Q2 = \omega L2/R2 \quad (10)$$

In this case, if the Q factor of the resonator is very high, approximation that neglects the second term of the right side of Equation (6) is permitted. Thus, the magnitude of the RF current (output current) I2 produced by the power-receiving antenna 108 is eventually derived by the following Equation (11):

$$I2 = k \times (L1/L2)^{0.5} \times IL1 \quad (11)$$

In this case, the RF current I2 depends on the RF current I1 supplied to the resonator at the transmitting end (i.e., the power-transmitting antenna 107), which will be the RF current IL1 flowing through the first inductor 107a, the coupling coefficient k between the resonators (antennas), and the first and second inductances L1 and L2.

As can be seen from Equation (11), the current step-up ratio Ir of the power generator of this preferred embodiment is represented by the following Equation (12):

$$Ir = |I2/I1|/Voc = k/Voc \times (L1/L2)^{0.5} \quad (12)$$

Also, the voltage step-up ratio Vr and the impedance conversion ratio Zr are given by the following Equations (13) and (14), respectively:

$$Vr = (Voc/k) \times (L2/L1)^{0.5} \quad (13)$$

$$Zr = (Voc/k)^2 \times (L2/L1) \quad (14)$$

As can be seen from Equation (13), if $(L2/L1) > (k/Voc)^2$ is satisfied, the voltage step-up ratio Vr is greater than one. Thus, it can be seen that if the coupling coefficient k falls, the voltage step-up ratio Vr rises. According to the conventional energy transfer method by electromagnetic induction, a decrease in coupling coefficient k will lead to a steep decrease in transmission efficiency. According to the resonant magnetic coupling method of the present invention, however, any decrease in coupling coefficient k will never cause such a steep decrease in transmission efficiency. Particularly if the respective Q factors of the resonators that are used as the power-transmitting and power-receiving antennas 107 and 108 are set to be high values, the decrease in transmission efficiency can be minimized with the voltage step-up ratio Vr increased.

To avoid the influence of partial shading on a solar power generation system, a parallel connection of multiple solar power generating sections is preferred to a series connection of a lot of solar power generating sections. To make a parallel connection of two solar power generating sections realize the same voltage characteristic as what is normally achieved by a series connection of two solar power generating sections, the output voltages of the respective solar power generating sections need to be doubled.

As can be seen from Equation (12), the voltage step-up ratio Vr gets equal to two when $(L2/L1)=4 \times (k/Voc)^2$ is satisfied. Since that relation $(L2/L1) \geq 4 \times (k/Voc)^2$ is satisfied according to the present invention, a voltage step-up ratio Vr of 2 or more can be achieved.

If $(L2/L1) \geq 100 \times (k/Voc)^2$ is satisfied, a voltage step-up ratio Vr of 10 or more is achieved. And if $(L2/L1) \geq 10000 \times (k/Voc)^2$ is satisfied, a voltage step-up ratio Vr of 100 or more is achieved.

It is easy for the power generating section of the present invention to set the k, Voc, L2 and L1 values so as to achieve such a high voltage step-up ratio Vr.

In addition, the power generator of this preferred embodiment matches the impedances of respective circuit blocks to each other if or when either the output impedance of the power generating section 101 or an environmental parameter varies, and therefore, can minimize multiple reflection of RF energy between those circuit blocks and can eventually increase the overall power generation efficiency.

Hereinafter, it will be described in further detail how to get impedance matching done according to this preferred embodiment.

Figure 7:
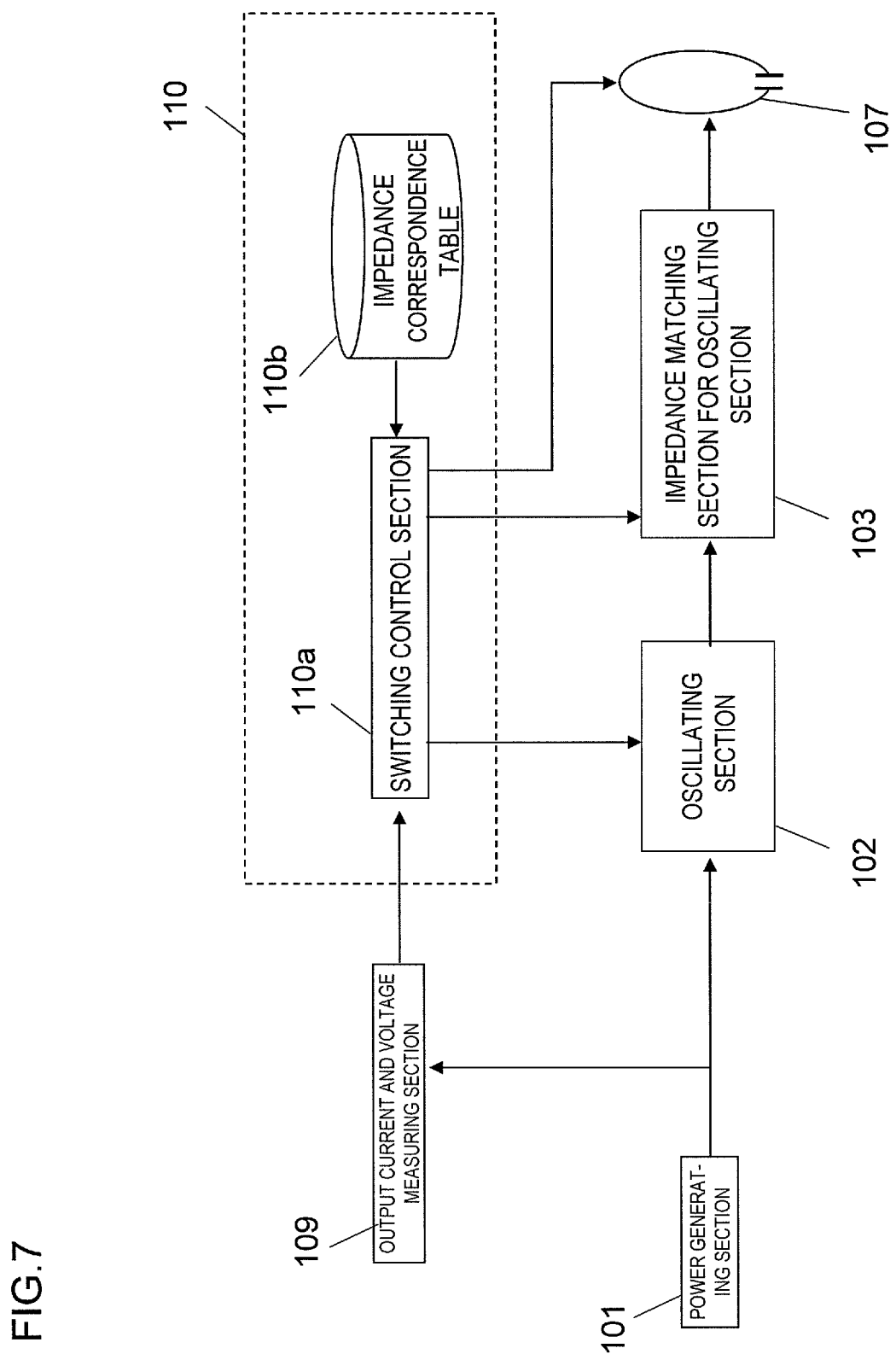
FIG. 7 schematically illustrates how impedance matching is carried out by a transmitting-end control section in the power generator according to the first preferred embodiment of the present invention.

FIG. 7 illustrates a configuration for the transmitting-end control section 110 and its association with other components according to this preferred embodiment. The transmitting-end control section 110 includes a switching control section 110a for changing the input impedances of the components that receive its output (which will be referred to herein as "connected devices") and an impedance correspondence table 110b that records data to be referred to when the input impedances of those connected devices are changed in accordance with a variation in the output impedance of the power generating section. In this case, the "connected devices" refer to the oscillating section 102, the impedance matching section for oscillating section 103 and the power-transmitting antenna 107. The impedance correspondence table 110b may be stored in a memory (not shown). According to this preferred embodiment, each of the oscillating section 102, the impedance matching section for oscillating section 103 and the power-transmitting antenna 107 has multiple switches for use to control the impedance. By changing the combination of the ON and OFF states of those switches in each functional section, the impedance of that functional section can be changed. In the impedance correspondence table 110b, correspondence between the output impedance range of the power generating section 101 and combinations of the ON and OFF states of the respective switches of each connected device has been defined and recorded in advance during the designing process. The following Table 1 may be used as the impedance correspondence table 110b. Table 1 has only columns for switches Q1 to Q3 in the oscillating section. However, the table should actually have columns for the switches of other functional sections, too.

TABLE 1

| Output impedance of power generating section | oscillating section Q1 | oscillating section Q2 | oscillating section Q3 |
|---|---|---|---|
| $Z \leq Z1$ | ON | OFF | OFF |
| $Z1 < Z \leq Z2$ | OFF | ON | OFF |
| $Z2 < Z$ | OFF | ON | ON |

Figure 8:
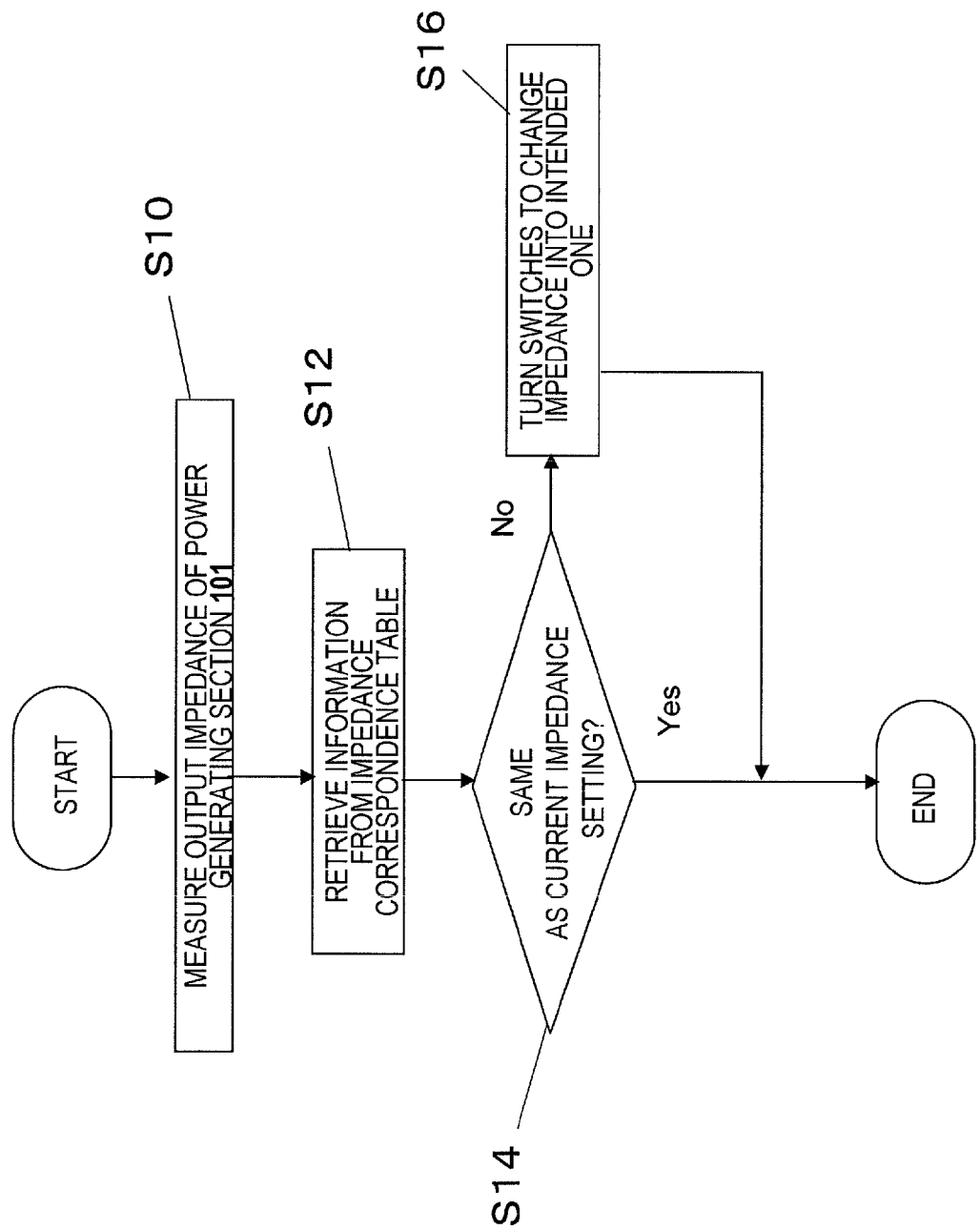
FIG. 8 is a flowchart showing the procedure of the impedance matching processing to be performed on the transmitting end by the power generator according to the first preferred embodiment of the present invention.

FIG. 8 is a flowchart showing the procedure of the impedance matching processing of this preferred embodiment. First of all, the transmitting-end control section 110 calculates the output impedance (Z=V/I) of the power generating section 101 based on the current (I) and voltage (V) that have been measured by the output current and voltage measuring section 109. Then, by reference to the impedance correspondence table 110b with the Z value thus obtained, an associated combination of switch states is determined for each connected device. If the impedance associated with the combination determined is different from the currently set impedance, the switches in the connected device are turned ON or OFF in accordance with the combination of the switch states. On the other hand, if the impedance associated with the combination determined is the same as the currently set impedance, those switches are never turned.

The processing performed by the transmitting-end control section 110 shown in FIG. 8 may be started either at regular intervals or when the magnitude of the variation in the output impedance value of the power generating section 101 reaches a predetermined value. By performing such a control operation, the input impedances of the oscillating section 102, the impedance matching section for oscillating section 103 and power-transmitting antenna 107 that follow the power generating section 101 can be matched to the output impedance of the power generating section 101. And if the input impedances of the respective functional sections are matched to the output impedance of the power generating section 101 that varies with the environmental condition, the maximum output voltage can always be obtained from the power generating section 101.

In this description, if two impedances are "equal to each other", then the impedances may naturally be exactly equal to each other but could also be just roughly equal to each other. Specifically, if the difference between the greater and smaller impedances is within 25% of the greater one, then those two impedances will also be regarded herein as being "equal to each other".

Hereinafter, it will be described in further detail how to get impedances matched to each other in respective functional sections.

Figure 9:
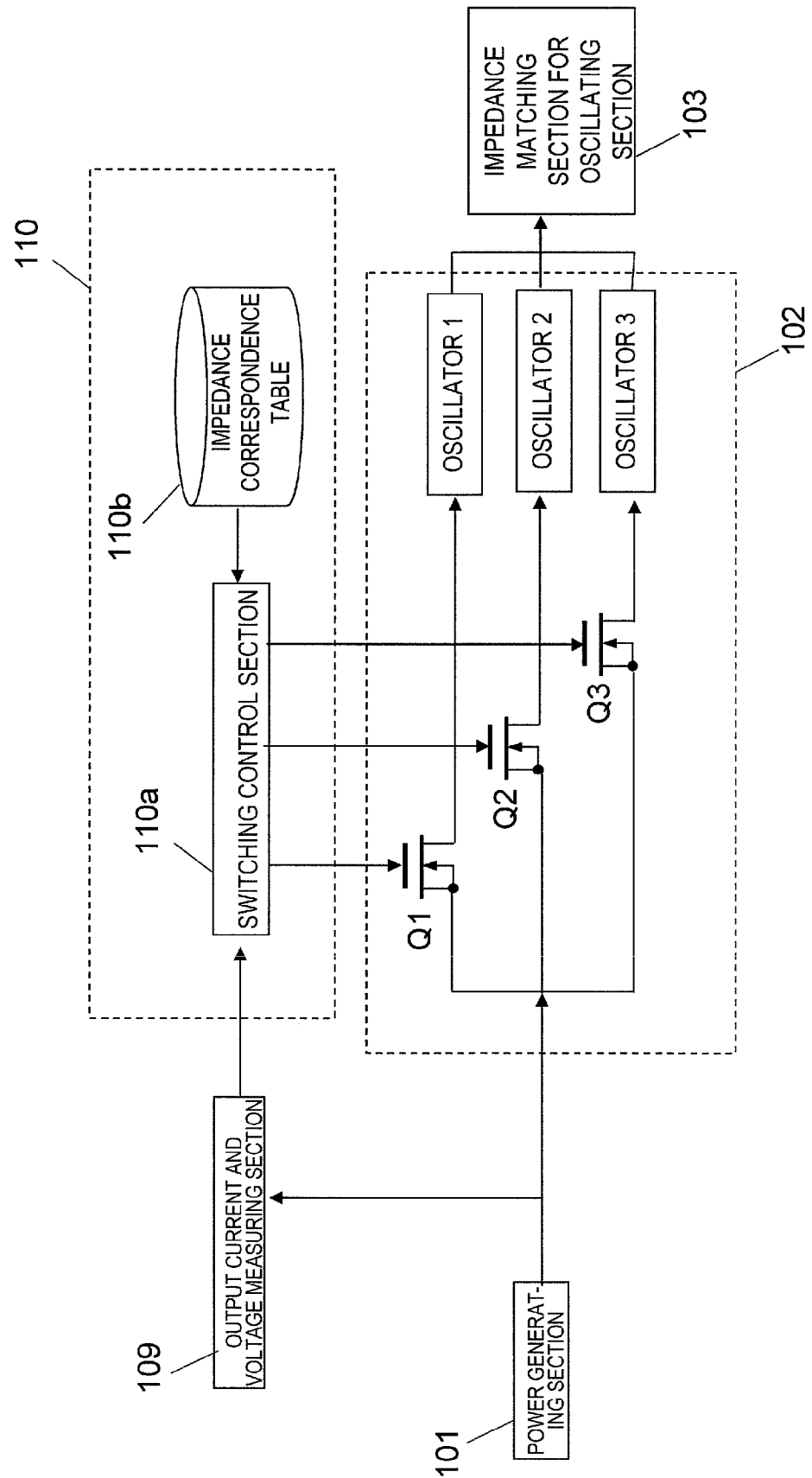
FIG. 9 illustrates configurations for the transmitting-end control section and oscillating section of the power generator according to the first preferred embodiment of the present invention.

FIG. 9 illustrates how the oscillating section 102 impedances are matched in a specific example of the present invention. The oscillating section 102 of this preferred embodiment includes three oscillators #1, #2 and #3, each of which is designed to have peak efficiency in a different input impedance range from the others' and which are provided with switches Q1, Q2 and Q3, respectively. By turning ON one of these three switches Q1 through Q3 and keeping the other two OFF, current will flow through only the oscillator that is connected to that switch in ON state. It should be noted that the number of oscillators to provide does not have to be three but may also be any other number. In the transmitting-end control section 110, the switching control section 110a turns only an associated one of the switches ON in accordance with a variation in the output impedance of the power generating section 101, thereby choosing an oscillator whose input impedance is matched to the output impedance of the power generating section 101. As a result, the power generation efficiency can be improved.

Suppose the oscillating section 102 is designed to carry out impedance matching so that the oscillators #1, #2 and #3 have peak efficiency when the input impedance Z satisfies $Z \leq 10\Omega$, $10\Omega < Z \leq 25\Omega$, and $25\Omega < Z$, respectively. The impedance correspondence table to be used in such a situation is defined by setting $Z1=10\Omega$ and $Z2=25\Omega$ in Table 1. For example, if the output impedance of the power generating section 101 that has been obtained based on the output of the output current and voltage measuring section 109 is $8\Omega$, the switching control section 110a of the transmitting-end control section 110 turns the respective switches of the oscillating section 102 so that only the switch Q1 is ON and the other two switches are OFF. As a result, even if the output impedance of the power generating section varies, the oscillating section 102 can still maintain sufficiently high efficiency.

Figure 10:
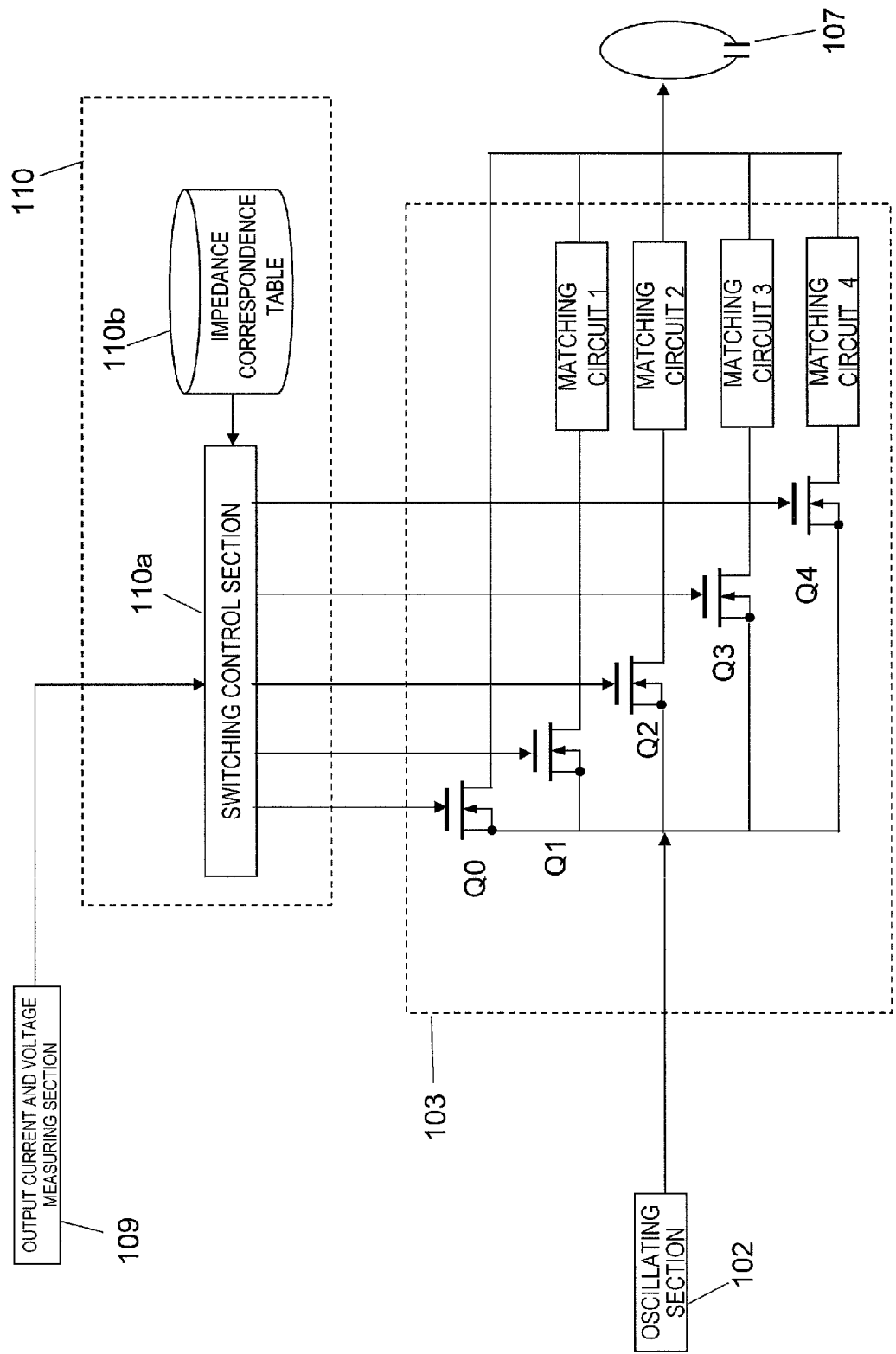
FIG. 10 illustrates configurations for the transmitting-end control section and impedance matching section for oscillating section of the power generator according to the first preferred embodiment of the present invention.

FIG. 10 illustrates how the impedance matching section for oscillating section 103 matches impedances in a specific example of the present invention. The impedance matching section for oscillating section 103 includes four matching circuits #1, #2, #3 and #4 for matching the output impedance of the oscillating section 102 to the input impedance of the power-transmitting antenna 107 that follows it. These matching circuits #1, #2, #3 and #4 are provided with switches Q1, Q2, Q3 and Q4, respectively. By turning ON one of these four switches Q1 through Q4 and keeping the other three OFF, current will flow through only the matching circuit that is connected to the switch in the ON state. It should be noted that the number of matching circuits provided does not have to be four but may also be any other number. Just like the switching control performed by the oscillating section 102, the transmitting-end control section 110 also turns the respective switches ON or OFF so that current will flow selectively through only a matching circuit that is associated with the output impedance of the power generating section 101. As a result, not only the input impedance of the impedance matching section for oscillating section 103 but also that of the power-transmitting antenna 107 can get matched to the output impedance of the oscillating section 102. By carrying out such impedance matching, multiple reflection of the RF energy by the power-transmitting antenna 107 can be reduced and sufficiently high transmission efficiency can be maintained.

Figure 11:
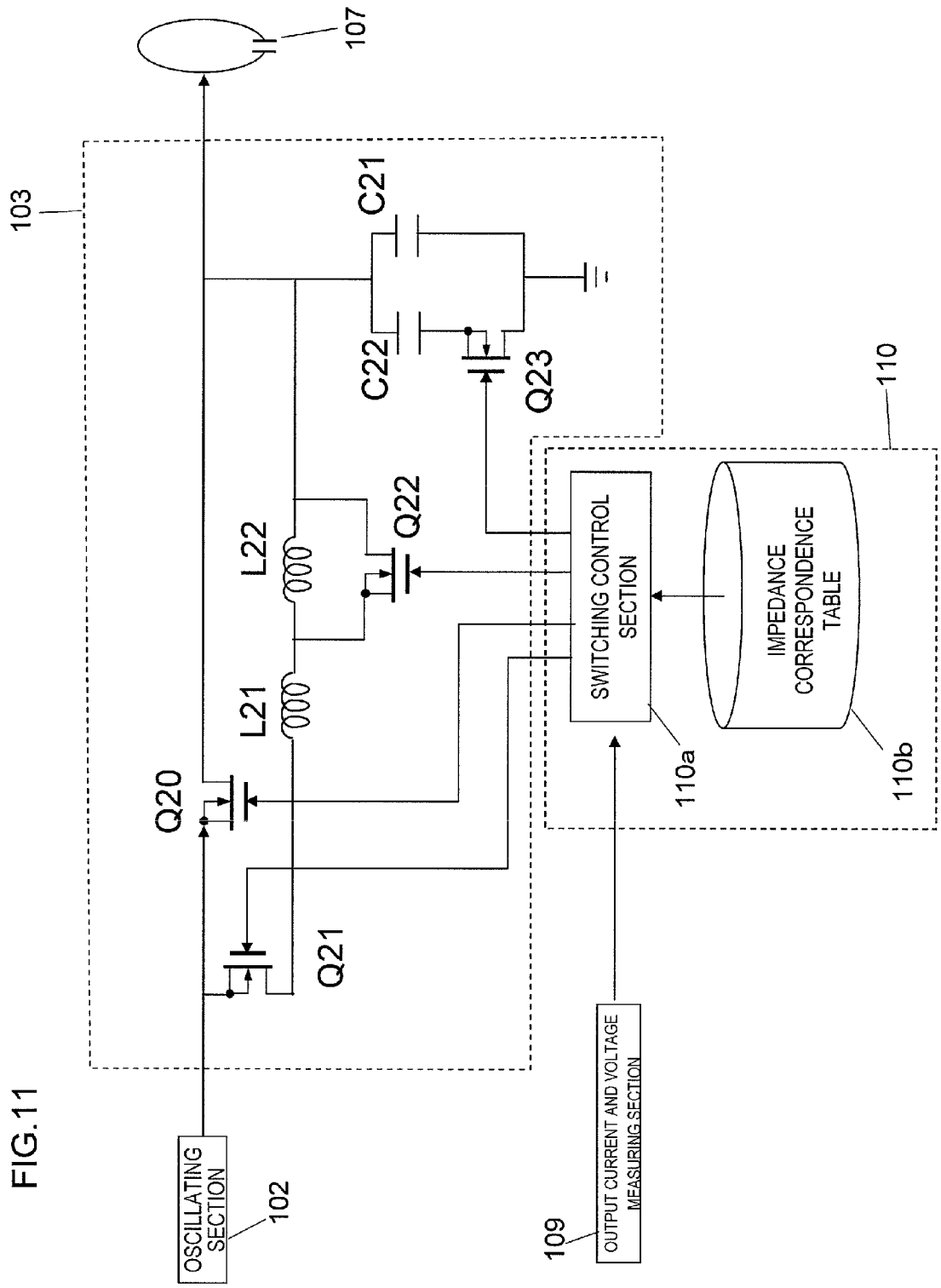
FIG. 11 illustrates alternative configurations for the transmitting-end control section and impedance matching section for oscillating section of the power generator according to the first preferred embodiment of the present invention.

FIG. 11 illustrates how the impedance matching section for oscillating section 103 carries out impedance matching in still another specific example of the present invention. In the configuration shown in FIG. 11, internal inductors or capacitors of the matching section 103 are switched, thereby getting a control done in the same way as in the configuration shown in FIG. 10. The following Table 2 illustrates an impedance correspondence table for use in such a configuration. In the impedance correspondence table, correspondence between the output impedances of the power generating section 101 and combinations of the ON and OFF states of the respective switches has been defined and recorded. By turning the switches in the matching section by reference to this impedance correspondence table, the control can get done in the same way as in a situation where one of multiple matching circuits is chosen. Consequently, even with such a configuration, the output impedance of the oscillating section 102 can be matched to the input impedance of the power-transmitting antenna 107 that follows the matching section 103.

TABLE 2

| Output impedance of power generating section | Q20 | Q21 | Q22 | Q23 | Matching circuit formed |
|---|---|---|---|---|---|
| Z0 | ON  | OFF | OFF | OFF | None |
| Z1 | OFF | ON  | OFF | OFF | L21 + C21 |
| Z2 | OFF | ON  | ON  | OFF | L21 + L22 + C21 |
| Z3 | OFF | ON  | OFF | ON  | L21 + C21 + C22 |
| Z4 | OFF | ON  | ON  | ON  | L21 + L22 + C21 + C22 |

Next, it will be described with reference to FIGS. 12 and 13 how the power-transmitting antenna 107 carries out impedance matching in a specific example of the present invention.

Figure 12:
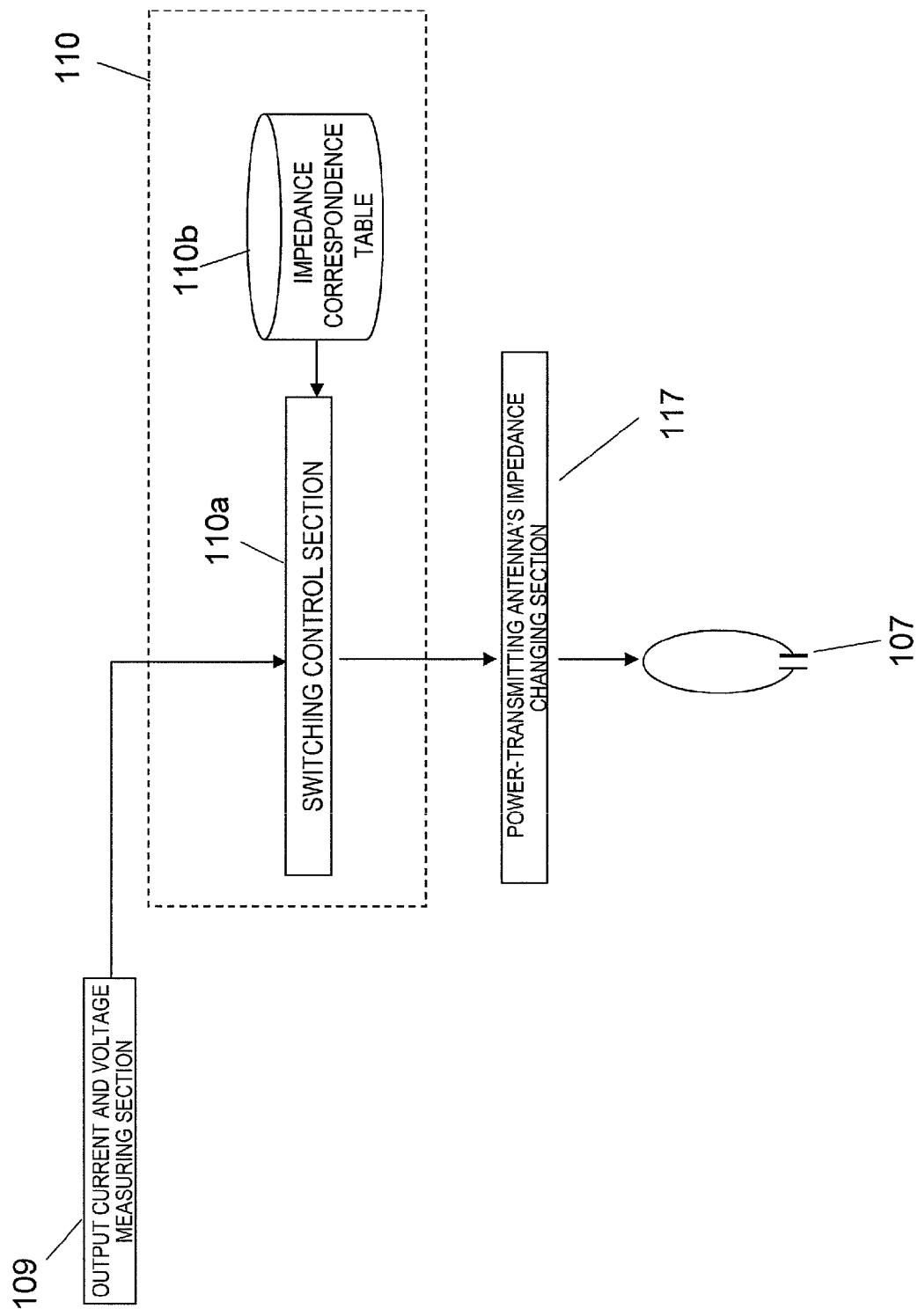
FIG. 12 illustrates configurations for the transmitting-end control section and power-transmitting antenna of the power generator according to the first preferred embodiment of the present invention.

FIG. 12 illustrates a configuration that is used to get impedance matching done by the power-transmitting antenna 107. As shown in FIG. 12, the power-transmitting antenna 107 is connected to a power-transmitting antenna's impedance changing section 117, which chooses at least one of multiple impedance changing methods. When the output impedance of the power generating section 101 varies, the switching control section 110a controls multiple switches of the power-transmitting antenna 107 by reference to the impedance correspondence table 110b. As a result, the input impedance of the power-transmitting antenna 107 can be matched to the output impedance of the impedance matching section for oscillating section 103.

FIGS. 13(a) through 13(d) illustrates examples of impedance changing methods, one of which is chosen by the power-transmitting antenna's impedance changing section 117 for the power-transmitting antenna 107.

FIG. 13(a) illustrates an example of an impedance changing method for the power-transmitting antenna 107. In this example, the power-transmitting antenna 107 includes multiple inductors, which are connected together in series, and multiple capacitors, which are connected in series to those inductors. This circuit has a number of switches, which are turned by the transmitting-end control section 110 according to the output impedance value of the power generating section 101. That is to say, the transmitting-end control section 110 performs a control operation so that current will flow selectively through at least one of these inductors and at least one of these capacitors. In this manner, the transmitting-end control section 110 changes the input impedance of the power-transmitting antenna 107 in accordance with a variation in the output impedance of the power generating section 101.

FIG. 13(b) illustrates another example of an impedance changing method for the power-transmitting antenna 107, which includes multiple inductors 107aa, which have mutually different inductances and which are arranged in parallel with each other, and another inductor 107ab, which is arranged near these inductors. This is a configuration including a passive circuit for transmitting electric power from one of those inductors 107aa to the inductor 107ab based on the principle of electromagnetic induction. According to this method, by changing the inductors 107aa to pass the current, the inductance formed by the inductors 107aa and 107ab and the capacitance between the inductors 107aa and 107ab vary, and therefore, the impedance can be changed. The transmitting-end control section 110 chooses one of the multiple inductors 107aa according to the output impedance value of the power generating section 101 and turns the switches so that current flows through the inductor 107aa chosen. In this manner, the transmitting-end control section 110 changes the input impedance of the power-transmitting antenna.

FIG. 13(c) illustrates still another example of an impedance changing method for the power-transmitting antenna 107. In this example, the power-transmitting antenna 107 includes an inductor, multiple capacitors that are connected in series to the inductor, and a movable portion 115 with a metallic or magnetic body. In such a configuration, the capacitance can be changed by bringing a metallic body closer to the inductor and the inductance can be changed by brining a magnetic body closer to the inductor. In this manner, the input and output impedances of the power-transmitting antenna 107 can be changed. Also, even by turning the switches that are connected to the capacitors, the input and output impedances of the power-transmitting antenna 107 can be changed, too. According to the output impedance value of the power generating section 101, the transmitting-end control section 110 not only changes the distance between the inductor and the movable portion but also turns the switches ON or OFF so that current flows through at least one of the capacitors. Consequently, the input impedance of the power-transmitting antenna 107 can be changed in accordance with a variation in the output impedance of the power generating section 101.

FIG. 13(d) illustrates yet another example of an impedance changing method for the power-transmitting antenna 107. In this example, the power-transmitting antenna 107 includes multiple resonators, which have mutually different input impedances and are arranged in parallel with each other. When the output impedance of the power generating section 101 varies, the resonators to use are changed. The transmitting-end control section 110 chooses one of those resonators according to the output impedance value of the power generating section 101 and makes current flow through the resonator chosen, thereby changing the input impedance of the power-transmitting antenna 107. In this case, to prevent power from being transmitted to the resonator not to use, that non-chosen resonator is not grounded.

The power-transmitting antenna's impedance changing section may change the impedance of the power-transmitting antenna 107 by at least one of these four methods described above. As a result, the input impedance of the power-transmitting antenna 107 can be matched to the output impedance of the impedance matching section for oscillating section 103. It should be noted that impedance matching is not always done on the power-transmitting antenna 107 by one of the four methods described above. Rather, any other method may also be adopted as long as the input impedance of the power-transmitting antenna 107 can be changed in accordance with a variation in the output impedance of the power generating section 101.

Hereinafter, it will be described how impedance matching is done on the receiving end.

Figure 14:
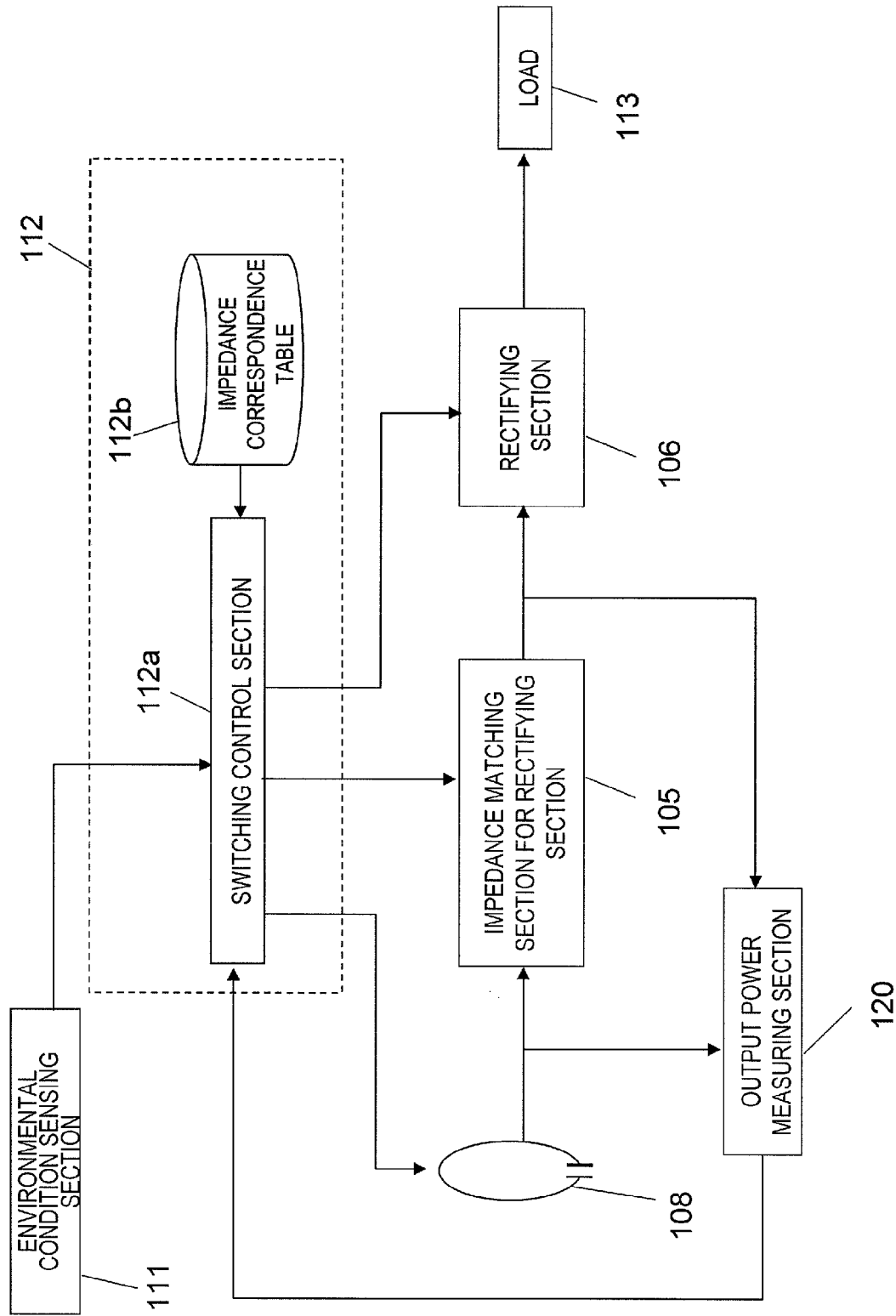
FIG. 14 schematically illustrates how impedance matching is carried out by a receiving-end control section in the power generator according to the first preferred embodiment of the present invention.

FIG. 14 illustrates a configuration for the receiving-end control section 112 and its association with other components according to this preferred embodiment. The receiving-end control section 112 includes a switching control section 112a for changing the input impedances of the components that receive its outputs (which will be referred to herein as "connected devices") and an impedance correspondence table 112b that records data to be referred to when the input impedances of those connected devices are changed in accordance with a variation in the output impedance of the power generating section. In this case, the "connected devices" refer to the power-receiving antenna 108, the impedance matching section for rectifying section 105 and the rectifying section 106. The impedance correspondence table 112b may be stored in a memory (not shown). According to this preferred embodiment, each of the power-receiving antenna 108, the impedance matching section for rectifying section 105 and the rectifying section 106 has multiple switches for use to control the impedance. By changing the combination of the ON and OFF states of those switches in each functional section, the impedance of that functional section can be changed. In the impedance correspondence table 112b, correspondence between the output impedance range of the power generating section 101 and combinations of the ON and OFF states of the respective switches of each connected device has been defined and recorded in advance during the designing process. Just like Table 1 described above, the impedance correspondence table 112b also has columns for switches in the power-receiving antenna 108, the impedance matching section for rectifying section 105 and the rectifying section 106. Optionally, the same table could be used in common as not only the impedance correspondence table 110b on the transmitting end but also as this impedance correspondence table 112b.

The power generator of this preferred embodiment further includes an output power measuring section 120, which measures the output powers of the power-receiving antenna 108 and the impedance matching section for rectifying section 105 and enters them to the switching control section 112a. Based on the output powers received, the switching control section 112a performs a switching control to be described below.

As soon as any variation in an environmental parameter of the power generating section 101 has been sensed by an environmental condition sensing section 111, the receiving-end control section 112 changes the impedances of the power-receiving antenna 108, the impedance matching section for rectifying section 105 and the rectifying section 106. In this preferred embodiment, the environmental parameter is supposed to represent the irradiance of the sunlight received. However, the environmental parameter may also be any other parameter such as the temperature of the power generating section 101 or combination of parameters that causes any variation in the output impedance of the power generating section 101.

Figure 15:
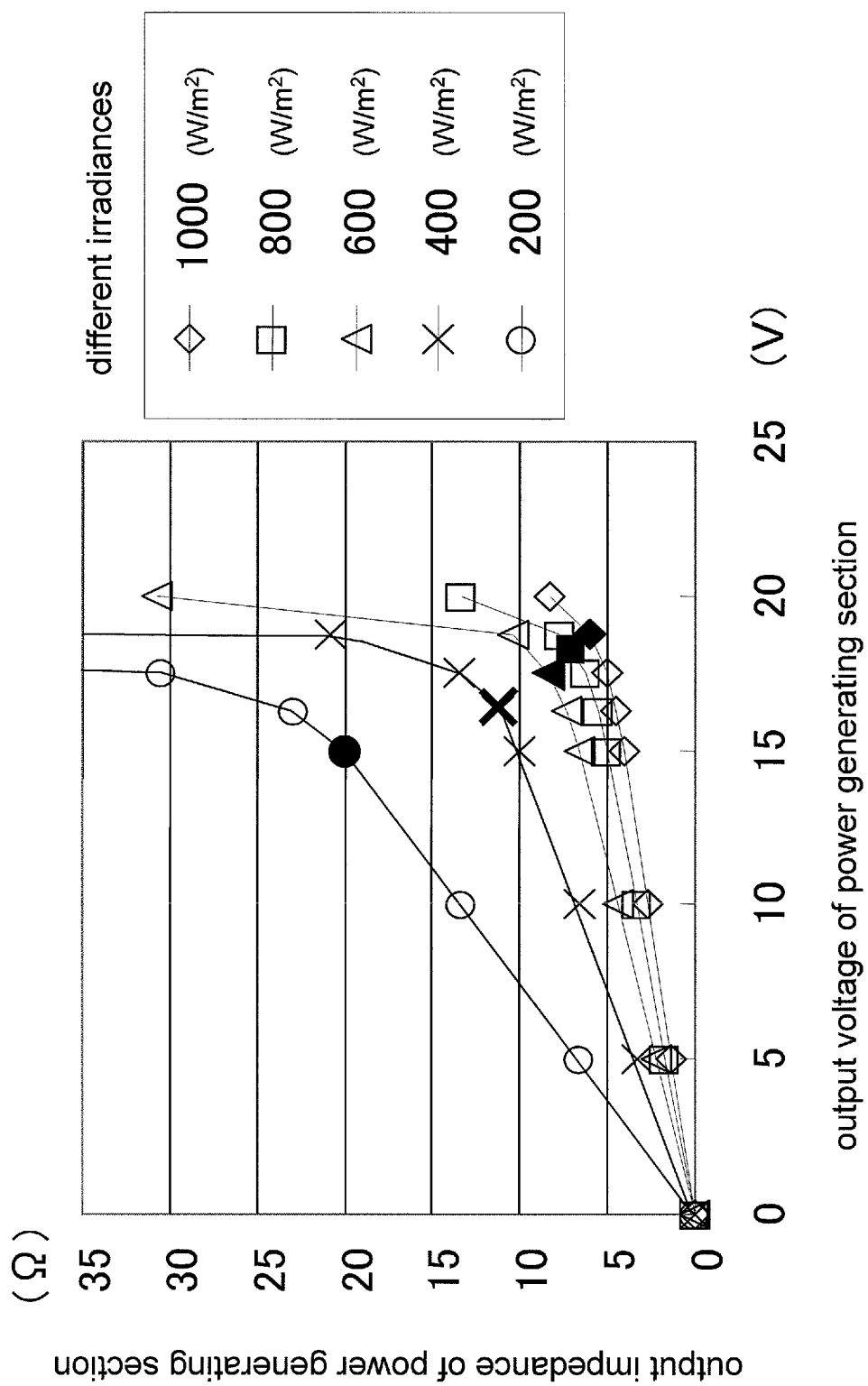
FIG. 15 is a graph showing how the curve representing a variation in output impedance with the output voltage of a power generating section changes with the irradiance of the sunlight received.

FIG. 15 is a graph showing the variation in the output impedance of a solar power generating device in relation to the output voltage of a cell with respect to changes in irradiance. In FIG. 15, the abscissa represents the output voltage of the power generating section 101 and the ordinate represents the output impedance of the power generating section 101. The solid circle, triangle, square and diamond and the bold cross indicate points where the output power becomes maximum at each irradiance. In the example illustrated in FIG. 15, supposing the voltage is constant, the higher the irradiance, the lower the output impedance. As can be seen, as the irradiance as measured on the photosensitive plane of the power generating section 101 varies, the output impedance of the power generating section 101 varies, too.

According to this preferred embodiment, the output impedance and output voltage that maximize the output power of the power generating section 101 are measured in advance on an irradiance basis, and are stored as characteristic information in the receiving-end control section 112. By reference to that characteristic information stored and based on the values supplied by the environmental condition sensing section 111, the receiving-end control section 112 determines the output impedance and output voltage that will maximize the output power of the power generating section 101 at the current irradiance. After that, by reference to the impedance correspondence table 112b with the output impedance value obtained, the receiving-end control section 112 turns the switches of the respective sections, thereby changing the impedances in those sections.

Figure 16:
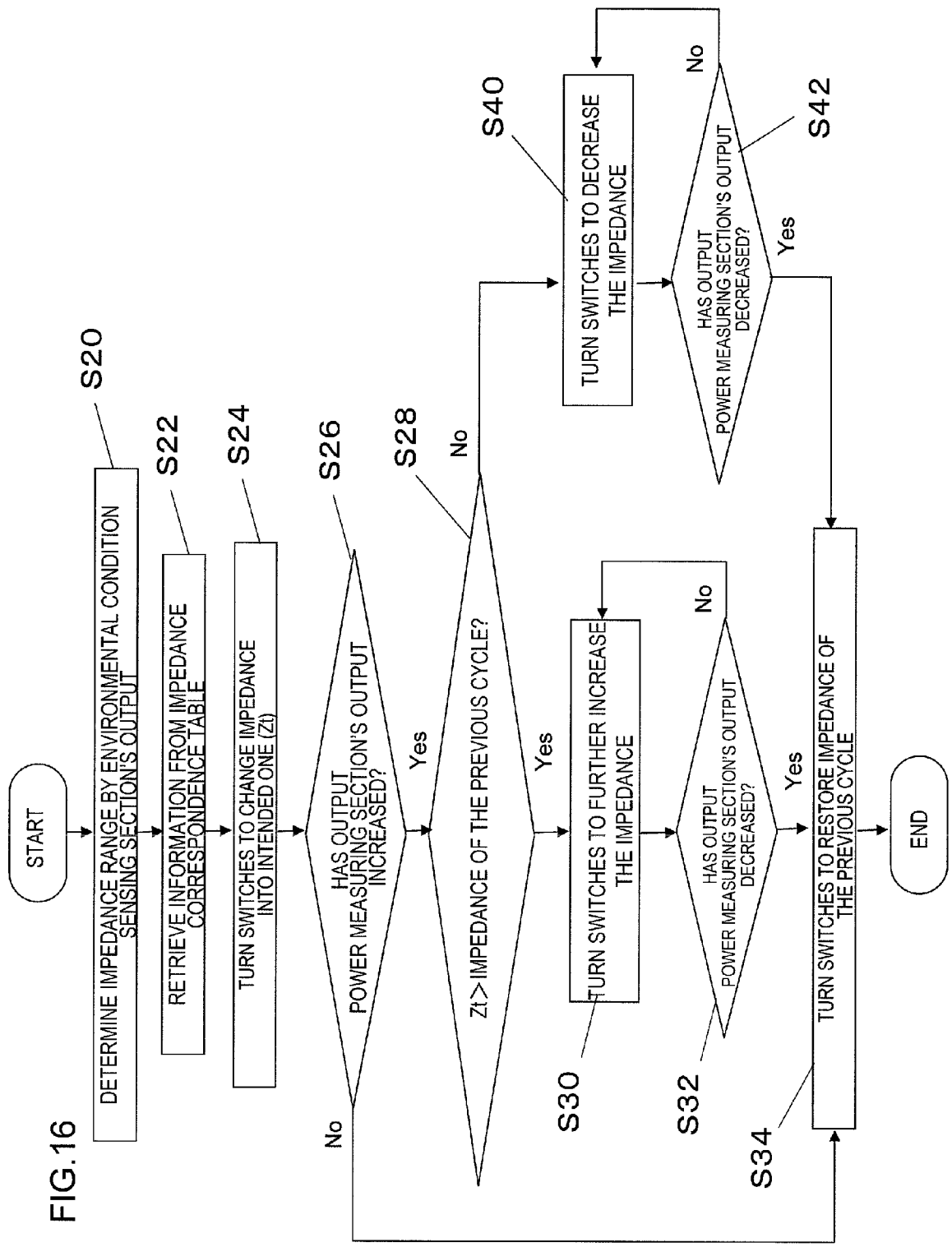
FIG. 16 is a flowchart showing the procedure of the impedance matching processing to be performed on the receiving end by the power generator according to the first preferred embodiment of the present invention.

FIG. 16 is a flowchart showing the procedure of impedance matching processing according to this preferred embodiment. First of all, in Step S20, the receiving-end control section 112 estimates the output impedance (Z=V/I) of the power generating section 101 based on an environmental parameter (e.g., irradiance) of the power generating section 101 that has been measured by the environmental condition sensing section 111. Next, by reference to the impedance correspondence table 112b with the Z value estimated, the receiving-end control section 112 retrieves information indicating an appropriate combination of ON and OFF states of the switches on a connected device basis in Step S22, and then turns the switches of each functional section in accordance with the retrieved information in Step S24. Unless the output of the output power measuring section 120 increases even by turning those switches, the previous combination of the switch ON and OFF states before the switches were turned is restored to cancel the change of the combinations and end the process in Step S34. On the other hand, if the output of the output power measuring section 120 has increased by turning those switches, then the switches are further turned to decrease the impedance in Step S40. Also, if the output of the output power measuring section 120 has decreased by turning the switches, the previous combination of the switch ON and OFF states before the switches were turned is restored to cancel the change of the combinations and end the process in Step S34. But unless the output of the output power measuring section 120 decreases even by turning the switches, the switches are further turned to decrease the impedance in Step S40. After that, the same series of processing steps are performed over and over again until convergence is achieved.

The processing to get done by the receiving-end control section 112 as shown in FIG. 16 may be started either at regular intervals or when the magnitude of the estimated variation in the output impedance value of the power generating section 101 reaches or exceeds a predetermined value. Also, the processing by the receiving-end control section 112 may be started either at the same time as, or at a different time from, the processing to get done by the transmitting-end control section 110. In any case, the receiving-end control section 112 changes the impedances following the processing flow described above, thereby keeping the impedances of respective circuit blocks on the receiving end matched to each other.

Hereinafter, it will be described in further detail how to match the impedances in the respective functional sections.

Figure 17:
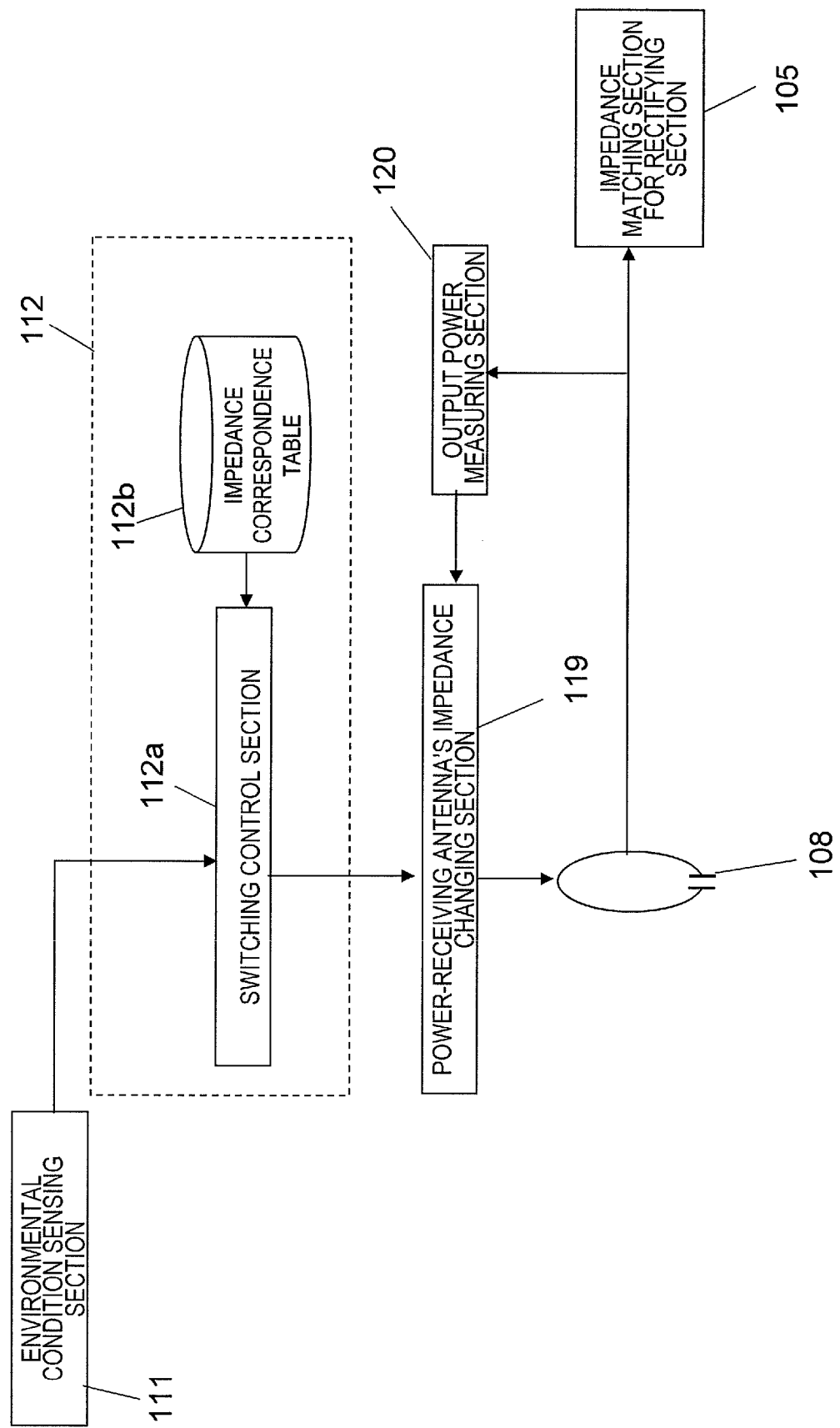
FIG. 17 illustrates configurations for the receiving-end control section and power-receiving antenna of the power generator according to the first preferred embodiment of the present invention.

FIG. 17 illustrates a configuration that is used to perform impedance matching with the power-receiving antenna 108. As shown in FIG. 17, the power-receiving antenna 108 is connected to a power-receiving antenna's impedance changing section 119, which utilizes at least one of multiple impedance changing methods. When an environmental parameter varies, the switching control section 112a controls multiple switches of the power-receiving antenna 108 by reference to the impedance correspondence table 112b. As a result, the power-receiving antenna 108 can be matched to the power-transmitting antenna 107 and the output impedance of the power-receiving antenna 108 can be matched to the input impedance of the impedance matching section for rectifying section 105.

FIGS. 18(a) through 18(d) illustrates examples of impedance changing methods, any one or more of which may be chosen by the power-receiving antenna's impedance changing section 119 for the power-receiving antenna 108.

FIG. 18(a) illustrates an example of an impedance changing method for the power-receiving antenna 108. In this example, the power-receiving antenna 108 includes multiple inductors, which are connected together in series, and multiple capacitors, which are arranged in parallel with those inductors. This circuit has a number of switches, which are turned by the receiving-end control section 112 according to the environmental parameter value. That is to say, the receiving-end control section 112 performs a control operation so that current will flow selectively through at least one of these inductors and at least one of these capacitors. In this manner, the receiving-end control section 112 changes the impedance of the power-receiving antenna 108 in accordance with a variation in the environmental parameter of the power generating section 101.

FIG. 18(b) illustrates another example of an impedance changing method for the power-receiving antenna 108, which includes multiple inductors 108aa, which have mutually different inductances and which are arranged in parallel with each other, and another inductor 108ab, which is arranged near these inductors. This configuration includes a passive circuit for transmitting electric power from one of those inductors 108aa to the inductor 108ab based on the principle of electromagnetic induction. According to this method, by changing the inductors 108aa to pass the current, the inductance formed by the inductors 108aa and 108ab and the capacitance between the inductors 108aa and 108ab vary, and therefore, the impedance can be changed. The receiving-end control section 112 chooses one of the multiple inductors 108aa according to the environmental parameter value and turns the switches so that current flows through the inductor 108aa chosen. In this manner, the receiving-end control section 112 changes the impedance of the power-receiving antenna.

FIG. 18(c) illustrates still another example of an impedance changing method for the power-receiving antenna 108. In this example, the power-receiving antenna 108 includes an inductor, multiple capacitors that are connected in series to the inductor, and a movable portion 115 with a metallic or magnetic body. In such a configuration, the capacitance can be changed by bringing a metallic body closer to the inductor and the inductance can be changed by brining a magnetic body closer to the inductor. In this manner, the impedance of the power-receiving antenna 108 can be changed. Also, even by turning the switches that are connected to the capacitors, the impedance of the power-receiving antenna 108 can be changed, too. According to the environmental parameter value, the receiving-end control section 112 not only changes the distance between the inductor and the movable portion but also turns the switches ON or OFF so that current flows through at least one of the capacitors. Consequently, the impedance of the power-receiving antenna 108 can be changed in accordance with a variation in the environmental parameter.

FIG. 18(d) illustrates yet another example of an impedance changing method for the power-receiving antenna 108. In this example, the power-receiving antenna 108 includes multiple resonators, which have mutually different input impedances and are arranged in parallel with each other. When the environmental parameter varies, the resonators to use are changed. The receiving-end control section 112 chooses one of those resonators according to the environmental parameter value and makes current flow through the resonator chosen, thereby changing the impedance of the power-receiving antenna 108. In this case, to prevent power from being transmitted to the resonator not in use, the non-chosen resonator is not grounded.

The power-receiving antenna's impedance changing section 119 may change the impedance of the power-receiving antenna 108 by at least one of these four methods described above. As a result, the input impedance of the impedance matching section for rectifying section 105 can be matched to the output impedance of the power-receiving antenna 108. It should be noted that impedance matching is not necessarily done on the power-receiving antenna 108 by one of the four methods described above. Rather, any other method may also be adopted as long as the input and output impedances of the power-receiving antenna 108 can be changed in accordance with a variation in an environmental parameter.

Figure 19:
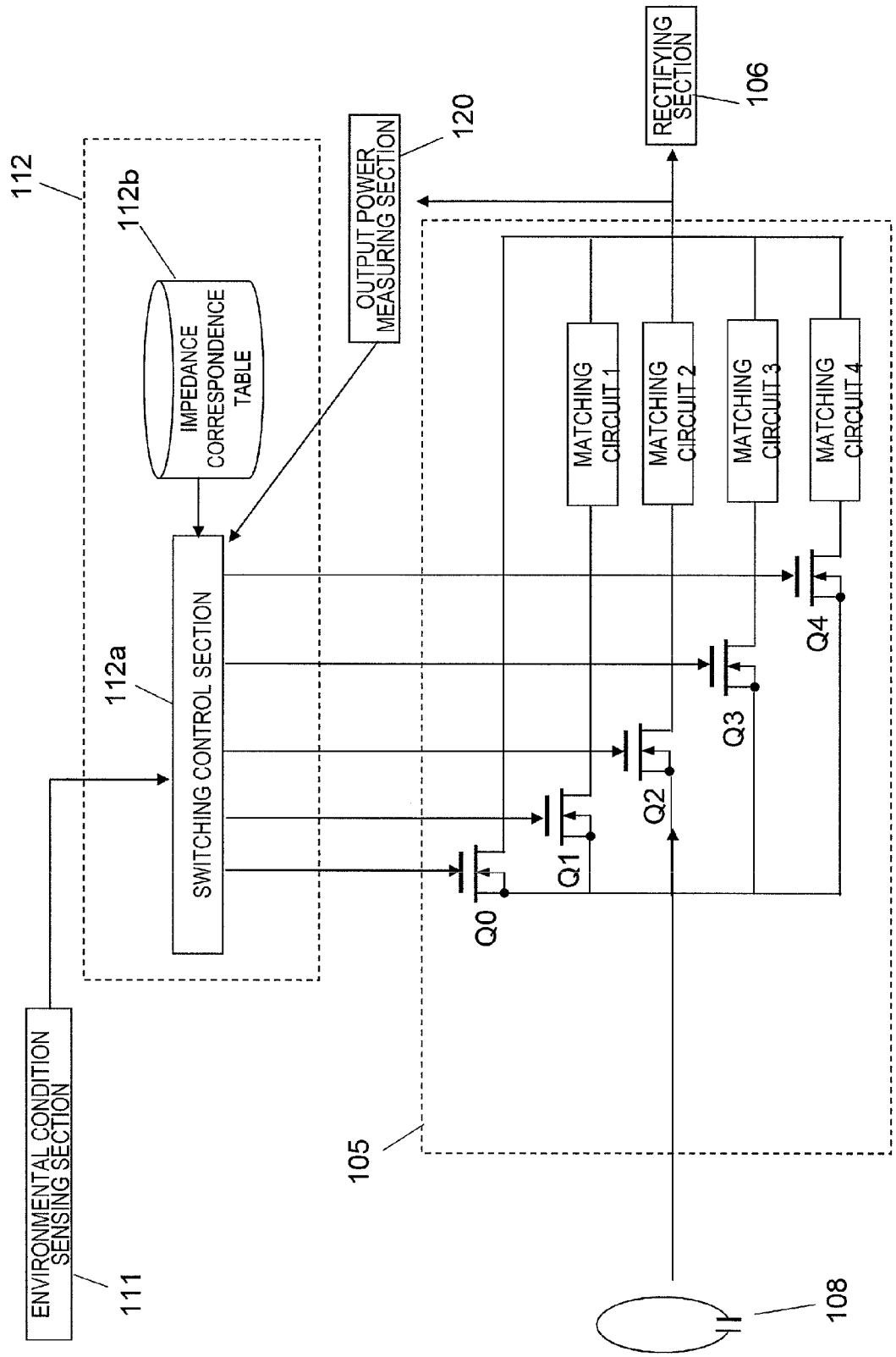
FIG. 19 illustrates configurations for the receiving-end control section and impedance matching section for rectifying section of the power generator according to the first preferred embodiment of the present invention.

FIG. 19 illustrates how the impedance matching section for rectifying section 105 matches impedances in a specific example of the present invention. The impedance matching section for rectifying section 105 of this preferred embodiment includes four matching circuits #1, #2, #3 and #4, which are provided to match the input impedance of the rectifying section 106 that follows it to the output impedance of the power-receiving antenna 108 and which are provided with switches Q1, Q2, Q3 and Q4, respectively. By turning ON one of these four switches Q1 through Q4 and keeping the other three OFF, current will flow through only the matching circuit that is connected to that switch in ON state. It should be noted that the number of matching circuits does not have to be four but may also be any other number. Just like the switching control performed by the power-receiving antenna 108, the receiving-end control section 112 also turns the respective switches ON or OFF so that current will flow selectively through only a matching circuit that is associated with the estimated output impedance of the power generating section 101. As a result, not only the input impedance of the impedance matching section for rectifying section 105 but also that of the rectifying section 106 that follows it can be matched to the output impedance of the power-receiving antenna 108. By carrying out such impedance matching, multiple reflection of the RF energy by the circuit blocks on the receiving end can be reduced and sufficiently high transmission efficiency can be maintained.

Figure 20:
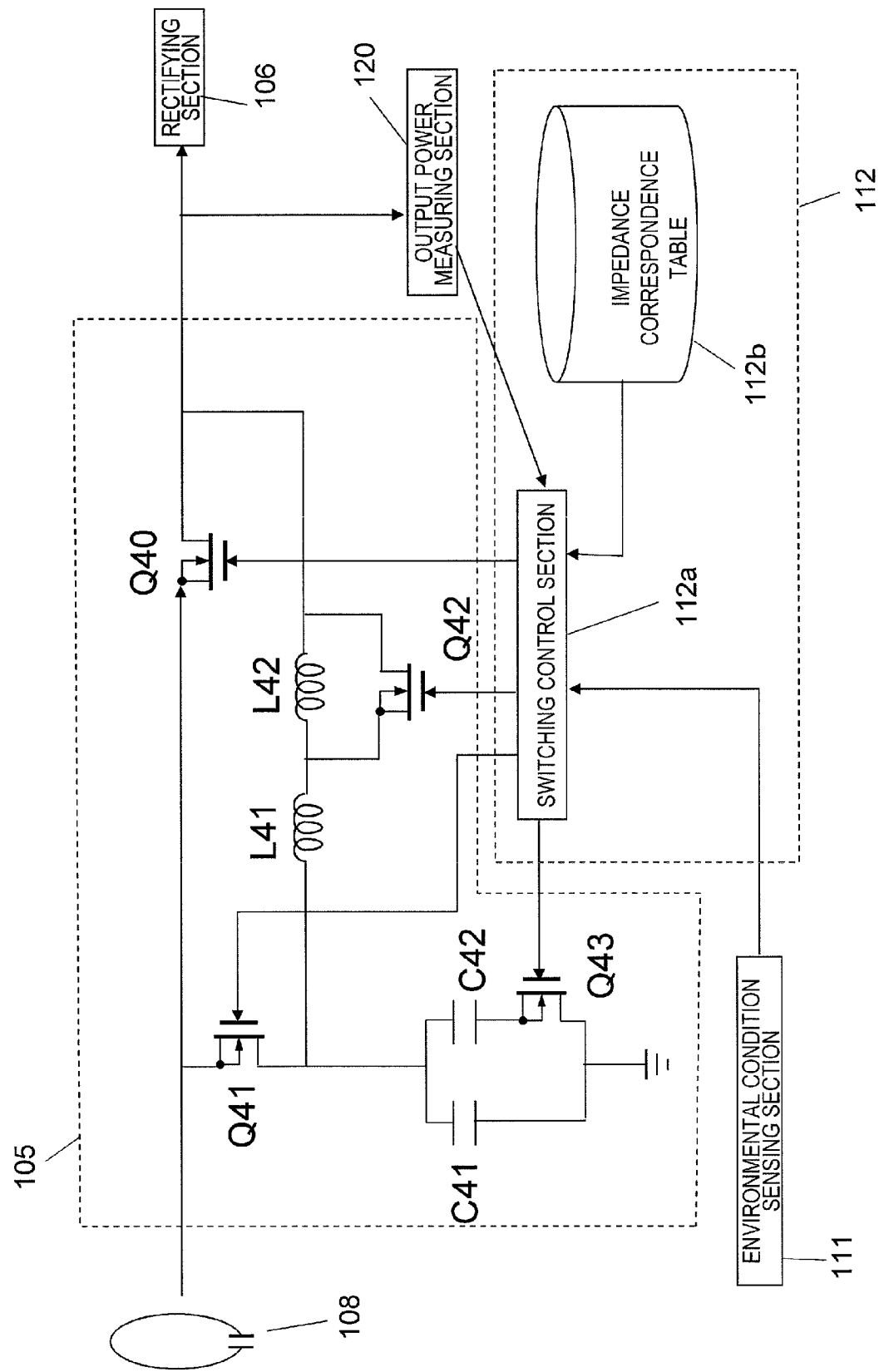
FIG. 20 illustrates configurations for the receiving-end control section and impedance matching section for rectifying section of the power generator according to the first preferred embodiment of the present invention.

FIG. 20 illustrates how the impedance matching section for rectifying section 105 carries out impedance matching in another specific example of the present invention. In the configuration shown in FIG. 20, internal inductors or capacitors of the matching section 105 are switched, thereby getting a control done in the same way as in the configuration shown in FIG. 19. The following Table 3 illustrates an impedance correspondence table 112b for use in such a configuration. In the impedance correspondence table 112b, correspondence between the estimated output impedances of the power generating section 101 and combinations of the ON and OFF states of the respective switches has been defined and recorded. By turning the switches in the matching section by reference to this impedance correspondence table 112b, the control is done in the same way as in a situation where one of multiple matching circuits is chosen. Consequently, even with such a configuration, the input impedance of the rectifying section 106 that follows it can be matched to the output impedance of the power-receiving antenna 108.

TABLE 3

| Output impedance of power generating section | Q40 | Q41 | Q42 | Q43 | Matching circuit formed |
|---|---|---|---|---|---|
| Z0 | ON | OFF | OFF | OFF | None |
| Z1 | OFF | ON | OFF | OFF | L41 + C41 |
| Z2 | OFF | ON | ON | OFF | L41 + L42 + C41 |
| Z3 | OFF | ON | OFF | ON | L41 + C41 + C42 |
| Z4 | OFF | ON | ON | ON | L41 + L42 + C41 + C42 |

Figure 21:
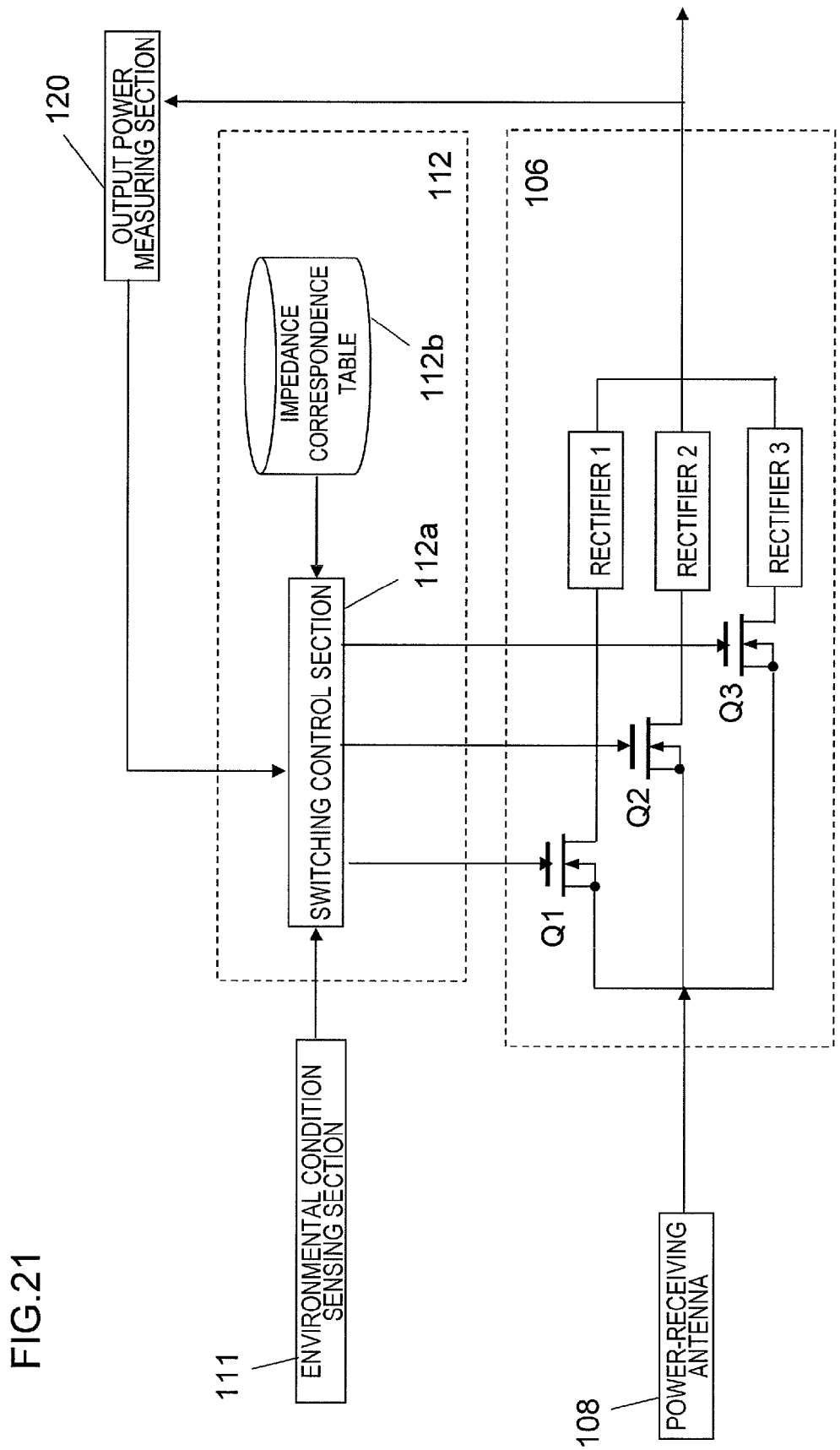
FIG. 21 illustrates configurations for the receiving-end control section and rectifying section of the power generator according to the first preferred embodiment of the present invention.

FIG. 21 illustrates how the rectifying section 106 is impedance matched in a specific example of the present invention. The rectifying section 106 of this preferred embodiment includes three rectifiers #1, #2 and #3, each of which is designed to have peak efficiency in a different input impedance range from the others' and which are provided with switches Q1, Q2 and Q3, respectively. By turning ON one of these three switches Q1 through Q3 and keeping the other two OFF, current will flow through only the rectifier that is connected to that switch in ON state. It should be noted that the number of rectifiers to provide does not have to be three but may also be any other number. In the receiving-end control section 112, the switching control section 112a turns only an associated one of the switches ON in response to a variation in the environmental parameter, thereby choosing a rectifier to be matched to the output impedance of the power generating section 101. As a result, the power generation efficiency can be improved.

Suppose the rectifying section 106 is designed so as to be able to achieve impedance matching most efficiently with the rectifier section #1 if the output impedance Z of the power generating section 101 satisfies $Z \leq 100\Omega$, with the rectifier section #2 if $100\Omega < Z \leq 250\Omega$ is satisfied, and with the rectifier section #3 if $250\Omega < Z$, is satisfied. In that case, the information stored in the impedance correspondence table says "if $Z \leq 100\Omega$, then turn switch Q1 ON and keep switches Q2 and Q3 OFF", "if $100\Omega < Z \leq 250\Omega$, then keep switches Q1 and Q3 OFF and turn switch Q2 ON" and "if $Z > 250\Omega$, then keep switches Q1 and Q2 OFF and turn switch Q3 ON". For example, if the output impedance of the oscillating section 102 is calculated to be $80\Omega$ based on the output of the environmental condition sensing section 111, the switching control section 112a of the receiving-end control section 112 turns the respective switches of the rectifying section 106 so that only the switch Q1 is ON and the other two switches are OFF. As a result, the rectifying section 106 can maintain sufficiently high efficiency even if the output impedance of the power generating section has varied.

It should be noted that the receiving-end control section 112 does not always have to match the impedances of respective functional sections to each other by estimating the output impedance of the power generating section 101 based on the output of the environmental condition sensing section 111. Alternatively, just like the transmitting-end control section 110, the receiving-end control section 112 may also match the impedances of the respective functional sections to each other by determining the output impedance of the power generating section 101 by the output of the output current and voltage measuring section 109. In that case, there is no need to provide the environmental condition sensing section 111 and the output of the output current and voltage measuring section 109 may be transmitted to the receiving-end control section 112 either wirelessly or through a cable. Still alternatively, the transmitting-end control section 110 may provide the receiving-end control section 112 with information indicating exactly what kind of impedance control the control section 110 has performed on which of the oscillating section 102, the impedance matching section for oscillating section 103 and the power-transmitting antenna 107. For example, if information about switching that has been carried out by the transmitting-end control section 110 on the power-transmitting antenna 107 is transmitted to the receiving-end control section 112, the receiving-end control section 112 can estimate the output impedance of the power generating section 101.

Optionally, the transmitting-end control section 110 may estimate the output impedance of the power generating section 101 based on the output of the environmental condition sensing section 111 instead of determining the output impedance of the power generating section 101 by the output of the output current and voltage measuring section 109.

According to the present invention, the transmitting-end control section 110 does not have to carry out impedance matching on all of the oscillating section 102, the impedance matching section for oscillating section 103 and the power-transmitting antenna 107. Rather, the power generation efficiency can still be increased sufficiently even by performing impedance matching on some of those functional sections including at least the oscillating section 102. Likewise, the receiving-end control section 112 does not have to carry out impedance matching on all of the rectifying section 106, the impedance matching section for rectifying section 105, and the power-receiving antenna 108. Instead, as long as impedance matching is done on at least one of the functional sections of the rectifying section 106, the impedance matching section for rectifying section 105, and the power-receiving antenna 108, the effects of the present invention can still be achieved.

In the preferred embodiments described above, each of the oscillating section 102, the impedance matching section for oscillating section 103, the power-transmitting antenna 107, the power-receiving antenna 108, the impedance matching section for rectifying section 105 and the rectifying section 106 has multiple switches. However, it is not always necessary for each of these functional sections to have a number of switches. Also, neither the transmitting-end control section 110 nor the receiving-end control section 112 has to operate as described above so long as the control section 110 or 112 can change the impedances of respective functional sections in accordance with a variation in the output impedance of the power generating section. For example, another circuit for performing the switching operation described above may be provided between the respective functional sections and the impedance between the circuit blocks may be matched to each other by controlling that circuit.

As described above, according to the preferred embodiments of the present invention, when energy is transferred by a non-contact method, the impedances of respective circuit sections are matched to each other according to the status of the operating environment, thereby always outputting maximum power from the power generating section 101. Also, even if the output voltage of the power generating section 101 is low, that voltage can still be raised to a level required by the grid. As a result, a power generation system, which can be installed at a reduced cost, which can have any deteriorated modules thereof readily replaced, and which does not need any voltage step-up device, is realized.

The power generator of this preferred embodiment can raise the output voltage of the rectifying section 106 to the range of 200 Vdc to 300 Vdc, for example. If necessary, it can also be raised to the range of 300-400 Vdc as required by a normal power conditioner or DC power supply system or to an even higher level, too.

Hereinafter, the effects to be achieved by the power generator of this preferred embodiment will be described in comparison with a conventional power generator.

In the apparatus disclosed in United States Patent Application Publication No. 2008/0278264, energy is transferred between two magnetic resonators. However, as that apparatus uses the same resonance method for the two resonators, the voltage is not increased while the energy is transferred. On the other hand, the increase in output voltage caused by the power generator of the present invention is an effect that has never been produced by that conventional apparatus and that is produced solely by adopting two different resonance structures, namely, a series magnetic resonance structure and a parallel magnetic resonance structure, for the power-transmitting and power-receiving antennas 107 and 108, respectively, and by transferring energy between those two different resonance structures.

It should be noted that a series resonant circuit and a parallel resonant circuit could also be used in a conventional RF telecommunications system such as an RF tag. However, the terminal impedance at the terminal of a probe for use to test the characteristic of an RF block of such an RF telecommunications system and the characteristic impedance of its RF cable are basically set to be 50Ω. That is why at a point of connection with an antenna of such an RF telecommunications system, circuit blocks are normally connected together with the impedance matched to 50Ω in both of its transmitter and receiver.

On the other hand, in the wireless transmission section of the present invention, the input to output impedance conversion ratio Zr is defined to be as high as over 100 or sometimes more than 20,000 depending on the conditions. And that high input to output impedance conversion ratio Zr would never have been imagined to be achievable by the conventional RF telecommunications system.

On top of that, according to the present invention, the longer the distance between the two resonators (or antennas) and the lower the coupling coefficient k, the higher the voltage step-up ratio Vr achieved will be. This is also an effect that would never have been easily expected from the structure and functions of the wireless transmission section for a known telecommunications system.

In a converter for use in a power circuit, for example, two inductors are arranged close to each other so as to function as a sort of wireless power transmission system. However, no resonant magnetic coupling is produced between those inductors. Also, such a converter could achieve the voltage step-up effect by increasing the ratio of the number of turns N2 of the second inductor to the number of turns N1 of the first inductor. However, if the converter booster has to achieve a voltage step-up ratio of 10 or more, then the number of turns N2 should be increased at least tenfold with respect to the number of turns N1. Such a significant increase in the number of turns N2 would increase the parasitic resistance component R2 in the second inductor proportionally, thus causing a decrease in transmission efficiency after all. In contrast, according to the present invention, even if the numbers of turns N1 and N2 are the same, a high Zr can still be achieved.

Embodiment 2

Figure 22:
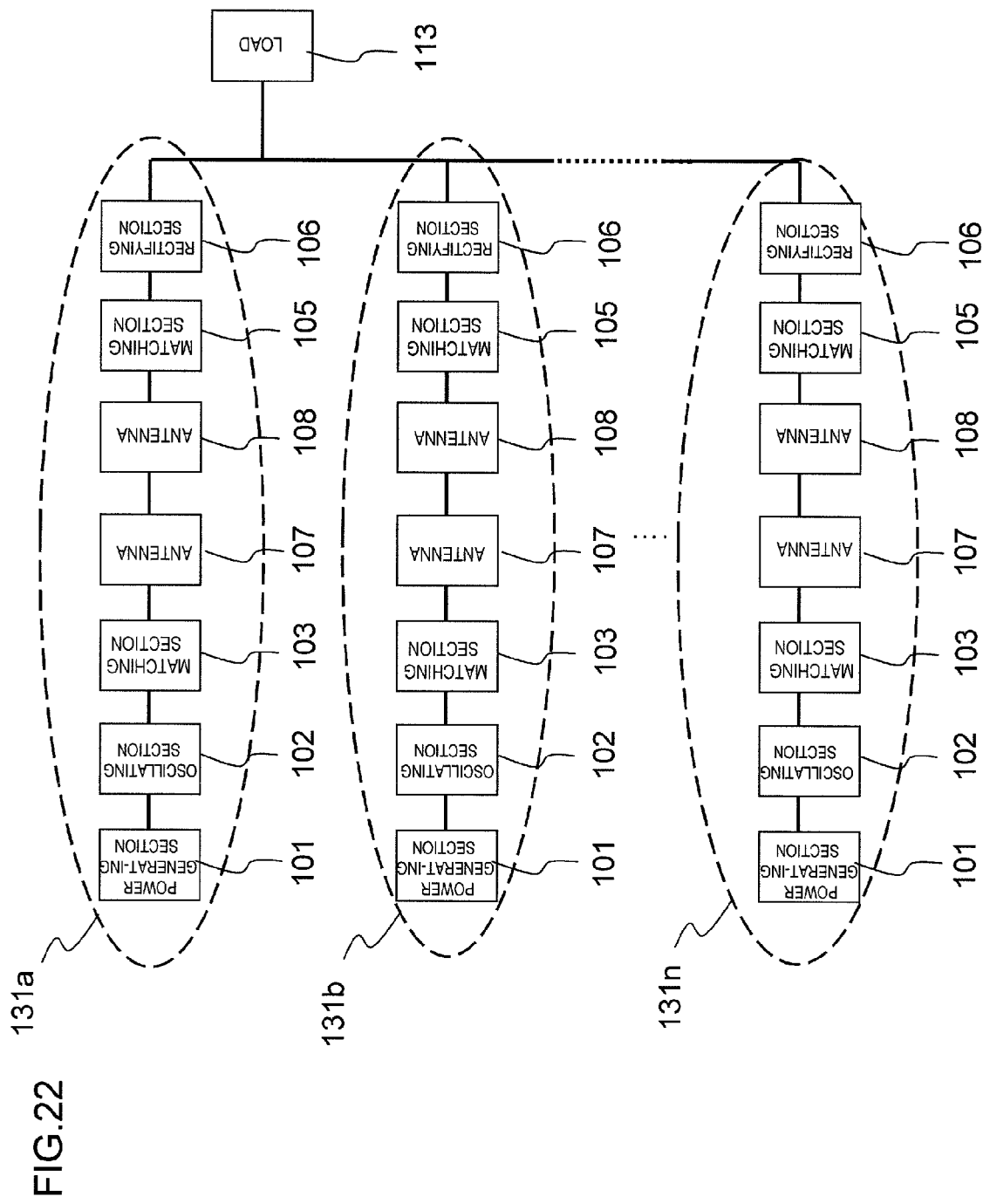
FIG. 22 is a block diagram illustrating a power generation system according to the present invention.

Hereinafter, a preferred embodiment of a power generation system according to the present invention will be described with reference to FIG. 22, which is a block diagram illustrating a power generation system as a second specific preferred embodiment of the present invention. In FIG. 22, any component having substantially the same function as its counterpart of the power generator of the preferred embodiments described above is identified by that counterpart's reference numeral and the description thereof will be omitted herein to avoid redundancies.

The power generation system shown in FIG. 22 includes a number of power generators 131a, 131b, . . . and 131n that are arranged in parallel with each other. In this preferred embodiment, each of these power generators 131a, 131b, . . . and 131n has the arrangement of the first preferred embodiment described above. However, to achieve the effects of the present invention, the power generation system of the present invention just needs to include at least two power generators that are arranged in parallel with each other.

Each of these power generators 131a through 131n includes a power generating section 101, an oscillating section 102, an impedance matching section for oscillating section 103, a power-transmitting antenna 107, a power-receiving antenna 108, a impedance matching section for rectifying section 105 and a rectifying section 106, which are connected together in series. Although each of these power generators 131a through 131n further includes a transmitting-end control section 110, a receiving-end control section 112, an environmental condition sensing section 111 and an output current and voltage measuring section 109, those components are not shown in FIG. 22.

The DC energy that has been generated by the power generating section 101 is converted into RF energy by the oscillating section 102 with high efficiency. That RF energy is next transferred by non-contact method from the power-transmitting antenna 107 at the transmitting end to the power-receiving antenna 108 at the receiving end and then converted into DC energy again by the rectifying section 106. Thereafter, the DC energies (or powers) that have been output by the respective power generators 131a through 131n are added together by the parallel connection and then the sum is supplied to a load 113.

According to this preferred embodiment, the output voltage supplied by each of these power generators 131a through 131n is much higher than the output voltage of its own power generating section. For that reason, even if the power generators 131a through 131n are arranged in parallel with each other, a voltage value that is even closer to the value required by the load 113 can be obtained.

On top of that, since a number of power generators 131a through 131n are arranged in parallel with each other, the performance of this power generation system should be more stabilized than the conventional one even if any of those power generators 131a through 131n deteriorated or if any difference were produced in an environmental condition for irradiating the power generators 131a through 131n with sunlight.

The load 113 may be a normal electronic device or a storage battery. Also, the load 113 may be an inverter function circuit for converting direct current into alternating current, a voltage step-up/down function circuit, or a power conditioner that has both of the inverter function and the voltage step-up/down function in combination. To match to the impedance of the load 113, some of the power generators could be connected together in series in the power generation system of this preferred embodiment.

The power generator of the present invention can increase the voltage significantly while cutting down the installation cost considerably, and therefore, can be used effectively in a solar power generation system to be installed on a building wall or at an elevated site and in a fuel cell power generation system, for example.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A power generator comprising:
a power generating section configured to output DC energy;

an oscillating section configured to convert the DC energy into RF energy with a frequency f0;

a power-transmitting antenna that is a series resonant circuit having a resonant frequency fT that is set to be substantially equal to the frequency f0, and configured to transmit the RF energy;

a power-receiving antenna that is a parallel resonant circuit having a resonant frequency fR that is set to be substantially equal to the frequency f0, and configured to receives at least a part of the RF energy that has been transmitted by the power-transmitting antenna;

a rectifying section configured to convert the RF energy that has been received by the power-receiving antenna into DC energy;

an impedance matching section for oscillating section that is arranged between the oscillating section and the power-transmitting antenna, and configured to match an input impedance of the power-transmitting antenna to an output impedance of the oscillating section; and a transmitting-end control section configured to match an input impedance of the oscillating section to an output impedance of the power generating section by changing the input impedance of the oscillating section in accordance with a variation in the output impedance of the power generating section, and configured to match an input impedance of the impedance matching section for oscillating section to the output impedance of the oscillating section by changing the input impedance of the impedance matching section for oscillating section in accordance with the variation in the output impedance of the power generating section.

2. The power generator of claim 1, further comprising a measuring section that measures the output current and output voltage of the power generating section, wherein the output impedance value of the power generating section is detected based on the output current and output voltage that have been measured by the measuring section.

3. The power generator of claim 1, wherein when the output impedance of the power generating section varies, the transmitting-end control section changes the input impedance of the power-transmitting antenna accordingly, thereby matching the input impedance of the power-transmitting antenna to the output impedance of the impedance matching section for oscillating section.

4. The power generator of claim 1, wherein the oscillating section includes multiple oscillators having respective predefined input impedance ranges, and wherein the transmitting-end control section chooses one of the oscillators according to the output impedance value of the power generating section and makes current flow through the oscillator chosen, thereby changing the input impedance of the oscillating section.

5. The power generator of claim 1, wherein the impedance matching section for oscillating section includes multiple matching circuits having respective predefined input impedance ranges, and wherein the transmitting-end control section chooses one of the matching circuits according to the output impedance value of the oscillating section and makes current flow through the matching circuit chosen, thereby changing the input impedance of the impedance matching section for oscillating section.

6. The power generator of claim 1, wherein the impedance matching section for oscillating section includes multiple capacitors and multiple inductors, and wherein the transmitting-end control section chooses a combination including one of the capacitors and one of the inductors according to the output impedance value of the oscillating section, and makes current flow through the capacitor and the inductor that are included in the chosen combination, thereby changing the input impedance of the impedance matching section for oscillating section.

7. The power generator of claim 3, wherein the power-transmitting antenna includes multiple inductors that are connected together in series and multiple capacitors that are connected in series to the inductors, and wherein the transmitting-end control section chooses at least one of the inductors and at least one of the capacitors according to the output impedance value of the power generating section, and makes current flow through the at least one inductor chosen and the at least one capacitor chosen, thereby changing the input impedance of the power-transmitting antenna.

8. The power generator of claim 3, wherein the power-transmitting antenna includes: at least two inductors, which have mutually different inductances and which are arranged in parallel with each other; and another inductor, which is arranged in the vicinity of the at least two inductors, and wherein the transmitting-end control section chooses one of the at least two inductors according to the output impedance value of the power generating section, and makes current flow through the chosen inductor, thereby changing the input impedance of the power-transmitting antenna.

9. The power generator of claim 3, wherein the power-transmitting antenna includes an inductor, multiple capacitors that are connected in series to the inductor, and a movable portion with a metallic or magnetic body, and wherein the transmitting-end control section changes the distance between the inductor and the movable portion, and chooses at least one of the capacitors, according to the output impedance value of the power generating section, and makes current flow through the at least one capacitor chosen, thereby changing the input impedance of the power-transmitting antenna.

10. The power generator of claim 3, wherein the power-transmitting antenna includes multiple resonators, which have mutually different input impedances, and wherein the transmitting-end control section chooses one of the resonators according to the output impedance value of the power generating section, and makes current flow through the resonator chosen, thereby changing the input impedance of the power-transmitting antenna.

11. The power generator of claim 1, further comprising:

an impedance matching section for rectifying section, which is arranged between the power-receiving antenna and the rectifying section in order to match the input impedance of the rectifying section to the output impedance of the power-receiving antenna; and a receiving-end control section that matches the input impedance of the impedance matching section for rectifying section to the output impedance of the power-receiving antenna by changing the input impedance of the impedance matching section for rectifying section in accordance with a variation in the output impedance of the power generating section.

12. The power generator of claim 11, wherein when the output impedance of the power generating section varies, the receiving-end control section changes the input impedance of the rectifying section accordingly, thereby matching the input impedance of the rectifying section to the output impedance of the impedance matching section for rectifying section.

13. The power generator of claim 11, wherein when the output impedance of the power generating section varies, the receiving-end control section changes the output impedance of the power-receiving antenna accordingly, thereby matching the output impedance of the power-receiving antenna to the input impedance of the impedance matching section for rectifying section.

14. The power generator of claim 11, further comprising an environmental condition sensing section that measures an environmental parameter of the power generating section,
wherein when the environmental parameter that has been measured by the environmental condition sensing section varies, the receiving-end control section changes the input impedance of the impedance matching section for rectifying section accordingly, thereby matching the input impedance of the impedance matching section for rectifying section to the output impedance of the power-receiving antenna.

15. The power generator of claim 14, wherein when the environmental parameter that has been measured by the environmental condition sensing section varies, the receiving-end control section changes the input impedance of the rectifying section accordingly, thereby matching the input impedance of the rectifying section to the output impedance of the impedance matching section for rectifying section.

16. The power generator of claim 14, wherein when the environmental parameter that has been measured by the environmental condition sensing section varies, the receiving-end control section changes the output impedance of the power-receiving antenna accordingly, thereby matching the output impedance of the power-receiving antenna to the input impedance of the impedance matching section for rectifying section.

17. The power generator of claim 11, wherein the impedance matching section for rectifying section includes multiple matching circuits, which have had their input impedance ranges defined in advance, and
wherein the receiving-end control section chooses one of those matching circuits and makes current flow through the matching circuit chosen, thereby changing the input impedance of the impedance matching section for rectifying section.

18. The power generator of claim 11, wherein the impedance matching section for rectifying section includes multiple capacitors and multiple inductors, and
wherein the receiving-end control section chooses a combination including one of the capacitors and one of the inductors and makes current flow through the capacitor and the inductor that are included in the chosen combination, thereby changing the input impedance of the impedance matching section for rectifying section.

19. The power generator of claim 11, wherein the rectifying section includes multiple rectifiers, which have had their input impedance ranges defined in advance, and
wherein the receiving-end control section chooses one of those rectifiers and makes current flow through the rectifier chosen, thereby changing the input impedance of the rectifying section.

20. The power generator of claim 11, wherein the power-receiving antenna includes multiple inductors that are connected together in series and multiple capacitors that are arranged in parallel with the inductors, and
wherein the receiving-end control section chooses at least one of the inductors and at least one of the capacitors and makes current flow through the at least one inductor chosen and the at least one capacitor chosen, thereby changing the output impedance of the power-receiving antenna.

21. The power generator of claim 11, wherein the power-receiving antenna includes: at least two inductors, which have mutually different inductances and which are arranged in parallel with each other; and another inductor, which is arranged in the vicinity of the at least two inductors, and
wherein the receiving-end control section chooses one of the at least two inductors and makes current flow through the chosen inductor, thereby changing the output impedance of the power-receiving antenna.

22. The power generator of claim 11, wherein the power-receiving antenna includes an inductor, multiple capacitors that are arranged in parallel with the inductor, and a movable portion with a metallic or magnetic body, and
wherein the receiving-end control section changes the distance between the inductor and the movable portion, chooses at least one of the capacitors and makes current flow through the at least one capacitor chosen, thereby changing the output impedance of the power-receiving antenna.

23. The power generator of claim 11, wherein the power-receiving antenna includes multiple resonators, which have mutually different input impedances, and
wherein the receiving-end control section chooses one of the resonators and makes current flow through the resonator chosen, thereby changing the output impedance of the power-receiving antenna.

24. The power generator of claim 14, wherein the environmental parameter includes a parameter representing the irradiance of the sunlight received at the power generating section.

25. The power generator of claim 14, wherein the environmental parameter includes a parameter representing the temperature of the power generating section.

26. The power generator of claim 14, wherein the environmental parameter measured by the environmental condition sensing section is transmitted wirelessly to the receiving-end control section.

27. The power generator of claim 1, wherein the power generating section is a solar power generating section.

28. The power generator of claim 27, wherein the solar power generating section generates electric power by using crystalline silicon.

29. The power generator of claim 27, wherein the solar power generating section and the power-transmitting antenna are arranged outside of a building and the power-receiving antenna is arranged inside of the building.

30. The power generator of claim 27, wherein the solar power generating section, the power-transmitting antenna, and the power-receiving antenna are arranged outside of a building, and
wherein the power-transmitting and power-receiving antennas are arranged so as to face each other at least partially.

31. The power generator of claim 1, wherein when the voltage step up ratio of the oscillating section is Voc, the inductance of the power-transmitting antenna is L1, the inductance of the power-receiving antenna is L2, and a coupling coefficient between the power-transmitting and power-receiving antennas is k, $(L2/L1) \geq 4(k/Voc)^2$ is satisfied.

32. The power generator of claim 31, wherein the rectifying section has an output voltage of 200 V to 300 V.

33. A power generation system comprising a number of power generators, wherein at least two of the power generators have their output terminals arranged in parallel with each other, and wherein the at least two power generators are as defined by claim 1.

34. A wireless power transmission system comprising:

an oscillating section configured to convert DC energy into RF energy with a frequency f0;

a power-transmitting antenna that is a series resonant circuit having a resonant frequency fT that is set to be substantially equal to the frequency f0, and configured to transmits the RF energy;

a power-receiving antenna that is a parallel resonant circuit having a resonant frequency fR that is set to be substantially equal to the frequency f0, and configured to receives at least a part of the RF energy that has been transmitted by the power-transmitting antenna;

a rectifying section configured to convert the RF energy that has been received by the power-receiving antenna into DC energy;

an impedance matching section for oscillating section that is arranged between the oscillating section and the power-transmitting antenna, and configured to match an input impedance of the power-transmitting antenna to an output impedance of the oscillating section; and a transmitting-end control section configured to match an input impedance of the oscillating section to an output impedance of a power generating section by changing the input impedance of the oscillating section in accordance with a variation in the output impedance of the power generating section, and configured to match an input impedance of the impedance matching section for oscillating section to the output impedance of the oscillating section by changing the input impedance of the impedance matching section for oscillating section in accordance with the variation in the output impedance of the power generating section.

* * * * *